(12) United States Patent
Zia et al.

(10) Patent No.: US 11,127,213 B2
(45) Date of Patent: Sep. 21, 2021

(54) TECHNIQUES FOR CROWDSOURCING A ROOM DESIGN, USING AUGMENTED REALITY

(71) Applicant: Houzz, Inc., Palo Alto, CA (US)

(72) Inventors: Khurram Mahmood Zia, Fredmont, CA (US); Sanjay Raman, San Francisco, CA (US); Aaron Yip, Menlo Park, CA (US)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 16/549,459

(22) Filed: Aug. 23, 2019

(65) Prior Publication Data

US 2020/0051338 A1 Feb. 13, 2020

Related U.S. Application Data

(63) Continuation-in-part of application No. 15/853,121, filed on Dec. 22, 2017.

(51) Int. Cl.
| | |
|---|---|
| G06T 19/00 | (2011.01) |
| G06F 9/451 | (2018.01) |
| G06F 9/54 | (2006.01) |
| G06Q 30/06 | (2012.01) |
| G06F 3/0481 | (2013.01) |

(Continued)

(52) U.S. Cl.
CPC ........ *G06T 19/006* (2013.01); *G06F 3/04815* (2013.01); *G06F 9/451* (2018.02); *G06F 9/547* (2013.01); *G06Q 30/0643* (2013.01); *G06Q 50/01* (2013.01); *G06F 3/04842* (2013.01); *G06T 2200/24* (2013.01); *G06T 2210/04* (2013.01)

(58) Field of Classification Search
None
See application file for complete search history.

(56) References Cited

U.S. PATENT DOCUMENTS

| | | |
|---|---|---|
| 7,062,722 B1 | 6/2006 | Carlin et al. |
| 2008/0071559 A1 | 3/2008 | Arrasvuori |
| 2013/0187905 A1 | 7/2013 | Vaddadi et al. |

(Continued)

FOREIGN PATENT DOCUMENTS

WO    2019126002    6/2019

OTHER PUBLICATIONS

"International Application Serial No. PCT US2018 065941, Invitation to Pay Additional Fees and Partial Search dated Mar. 21, 2019", 13 pgs.

(Continued)

*Primary Examiner* — Vu Nguyen
(74) *Attorney, Agent, or Firm* — Schwegman Lundberg & Woessner, P.A.

(57) ABSTRACT

Embodiments of the present invention, as presented herein, relate to an augmented reality application-based service, which facilitates the sharing of a design request, by a first end-user, via a messaging application or social networking service. The design request may be included as part of a content posting published to a feed and shared with members of a social networking service, and enables the members to select and position products (e.g., images of household items) using a room design application, such that the selected and positioned products can be rendered in a live AR viewing session by the first end-user.

10 Claims, 13 Drawing Sheets

(51) Int. Cl.
*G06Q 50/00* (2012.01)
*G06F 3/0484* (2013.01)

(56) References Cited

U.S. PATENT DOCUMENTS

| | | | |
|---|---|---|---|
| 2016/0133230 A1* | 5/2016 | Daniels | G06F 3/147 345/633 |
| 2016/0240010 A1* | 8/2016 | Rosenthal | H04N 21/4784 |
| 2018/0143756 A1 | 5/2018 | Mildrew et al. | |
| 2019/0172261 A1 | 6/2019 | Alt et al. | |
| 2019/0197599 A1 | 6/2019 | Zia et al. | |

OTHER PUBLICATIONS

"International Application Serial No. PCT US2018 065941, International Search Report dated May 14, 2019", 6 pgs.

"International Application Serial No. PCT US2018 065941, Written Opinion dated May 14, 2019", 10 pgs.

"U.S. Appl. No. 15/853,121, Restriction Requirement dated Dec. 30, 2019", 5 pgs.

"U.S. Appl. No. 15/853,121, Response filed Mar. 2, 2020 to Restriction Requirement dated Dec. 30, 2019", 6 pgs.

"U.S. Appl. No. 15/853,121, Non Final Office Action dated Apr. 27, 2020", 12 pgs.

Klaus, Ahlers H, "Distributed Augmented Reality for Collaborative Design Applications", Computer Graphics Forum, vol. 14, No. 3, (Aug. 1995), 3-14.

"U.S. Appl. No. 15/853,121, Final Office Action dated Aug. 4, 2020", 12 pgs.

"U.S. Appl. No. 15/853,121, Non Final Office Action dated Dec. 22, 2020", 11 pgs "U.S. Appl. No. 15/853,121, Response filed Jul. 27, 2020 to Non Final Office Action dated Apr. 27, 2020", 9 pgs.

"U.S. Appl. No. 15/853,121, Response filed Dec. 4, 2020 to Final Office Action dated Aug. 4, 2020", 9 pgs.

"International Application Serial No. PCT/US2018/065941, International Preliminary Report on Patentability dated Jul. 2, 2020", 12 pgs.

"U.S. Appl. No. 15/853,121, Response filed Apr. 22, 2021 to Non Final Office Action dated Dec. 22, 2020", 10 pgs.

\* cited by examiner

TECHNIQUES FOR CROWDSOURCING A ROOM DESIGN, USING AUGMENTED REALITY

CROSS-REFERENCE TO RELATED APPLICATIONS

This application is a continuation-in-part of U.S. patent application Ser. No. 15/853,121, with title, "Techniques for Recommending and Presenting Products in an Augmented Reality Scene," filed on Dec. 22, 2017.

TECHNICAL FIELD

The subject matter disclosed herein generally relates to data processing systems and computer-based, user interfaces for crowdsourcing a room design. More specifically, the present invention relates to computer program products, methods and systems that enable a room design service via which a first end-user can generate and share with members of a social networking service, one or more photos or videos of a physical space that are enhanced with a data representation of a virtual space that corresponds with the physical space, such that the members of the social networking service can select and position products (e.g., images of home furnishings and related products) within the virtual space, to ultimately create an augmented reality scene where images of the products are superimposed in the one or more photos or videos of the physical space.

BACKGROUND

In the context of computing, augmented reality ("AR") is a live direct, or indirect, view of a physical, real-world scene whose elements are "augmented" with superimposed, computer-generated sensory input, such as video or graphic images. These added images, which are overlaid upon the real-world scene, serve to enhance the scene and provide an enriched visual experience for the end-user. Advancements in various computing and sensor technologies have made it possible to have mobile computing devices (e.g., mobile phones, tablet computers, head-mounted displays and glasses) capable of executing AR applications. As an example, modern versions of mobile operating systems, such as iOS® from Apple® and the Android® operating system from Google®, provide software frameworks and development tools that allow developers to create AR applications for mobile phones, tablets and other mobile computing devices.

With a typical AR application for a mobile computing device, an end-user manipulates the mobile computing device to point a camera of the device in the direction of a real-world scene the end-user wishes to render in AR. The scene is then captured by the camera (e.g., as a photograph or video) and displayed on the display of the device, while the device simultaneously superimposes one or more images (graphics and/or video) on the scene. The camera and/or other sensors may capture additional information from the environment that allows the mobile computing device to determine its position, orientation and motion, relative to visually distinguishing features, objects and/or inferred planes (e.g., walls, floors or other flat surfaces) in the images being captured by the camera, and thereby manipulate the rendering (e.g., position, skew and size) of any superimposed images to maintain the proper perspective and scale. This makes the presentation of the superimposed images seem realistic, creating an illusion for the viewer that the objects represented by the superimposed images are physically present in the scene.

As AR-related technologies improve, new AR applications are being developed and introduced. In the retail industry, AR applications are increasingly being used to provide end-users with the ability to visualize products (e.g., home furnishings and related products) in and around their real-world environments. For example, several applications have been developed that allow an end-user to select a product (e.g., a chair) from an online "catalog" of products, and then place the chair in a room using an AR application, allowing the end-user to visualize the room with the chair, without the commitment and hassle of having the chair physically present. Accordingly, the room can be viewed via the display of the end-user's mobile computing device to visualize the room, as if the chair was present.

One fundamental problem with conventional approaches for using AR in e-commerce is the burden of selecting and positioning products is on the end-user (e.g., the potential customer) who has access to the physical space in which the products are ultimately to be placed. In most instances, the consumer is not familiar with the catalog of available products, and may not have expertise in room design. Furthermore, hiring a room designer and having the room designer visit and inspect the physical space for which the room design is being sought, is both expensive and time consuming.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
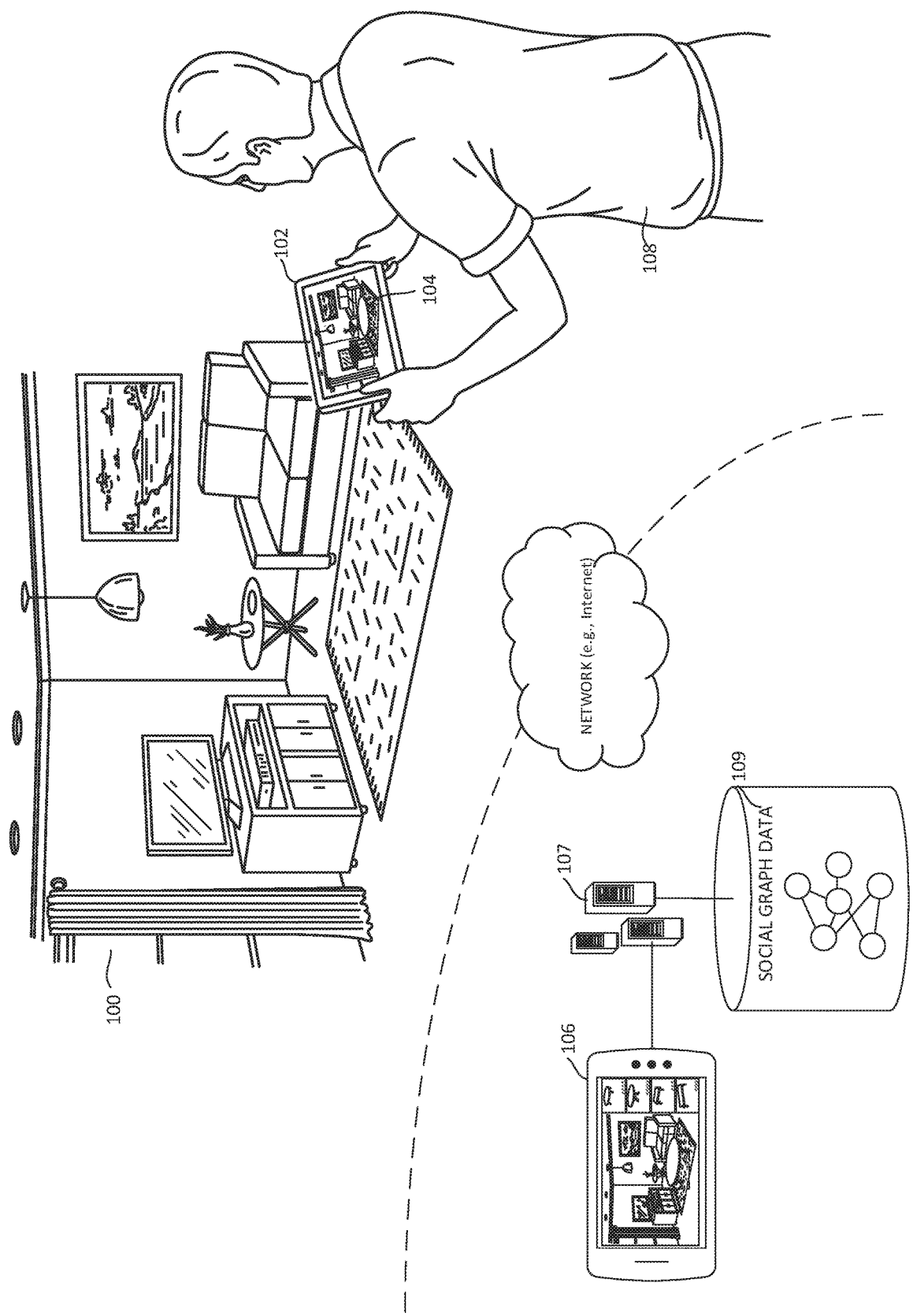
FIG. 1 is an illustration showing a scene (e.g., a room) that is being rendered on an AR-capable mobile application executing on a tablet computer and augmented with an image of a coffee table that has been selected and placed in the AR view of the room by a person operating a client computing device that is remote from the room and tablet computer, according to some embodiments of the present invention.

Described herein are methods, systems and computer program products to facilitate techniques for leveraging a social networking service to crowdsource a room design using an application-based augmented reality room design service. In the following description, for purposes of explanation, numerous specific details are set forth in order to provide a thorough understanding of the various aspects of different embodiments of the present invention. It will be evident, however, to one skilled in the art, that the present invention may be practiced without all of these specific details.

As presented herein, the present invention is described in the context of an online, augmented reality (AR), application-based room design service. In general, this room design service provides a collaborative platform via which end-users (e.g., potential consumers) can interact—in some instances, in real time, while in other instances, asynchronously—with one of a team of room designers, and/or members of a social networking service. The design service is generally comprised of two components that operate together—an AR mobile application, via which an end-user captures and views an AR view of a physical space, and a room design application having a user interface via which a room designer selects and positions products, which ultimately causes images of those products to appear in the AR view of the physical space, as generated at the AR-capable mobile computing device of the end-user. As such, for purposes of the present disclosure, the term "end-user" will be used in reference to a potential consumer or person who is operating an AR-capable mobile computing device, executing an AR mobile application, in some physical space (e.g., a room) in an effort to visualize that space, enhanced with some visual content. Similarly, for purposes of the present disclosure, the term "room designer" is used in reference to a person operating a room design application, typically executing on a client computing device, that is remote from the end-user. For purposes of the present disclosure, a "room designer" may be a person having specific design expertise, skills and training, such that the person is acting and employed as a room designer. However, as described in greater detail below, a "room designer" may also be any person who is using the room design application and service, regardless of formal training and skills. Specifically, as described in greater detail below, consistent with some embodiments, the end-user (e.g., potential consumer) may target friends and/or family members, who are members of a social networking service, with whom the end-user has established a formal connection via a social networking service to request help in selecting and positioning products for a particular physical space (e.g., room). In this context, these members of the social networking service are "room designers".

Using the AR mobile application, an end-user will invoke an AR viewing session. During the AR viewing session, the AR-capable mobile computing device uses input received from a combination of one or more image sensors and motion sensors to generate a data representation of a virtual space that corresponds with the physical space in which the mobile computing device is being operated. The virtual space is constructed from mobile sensors that enable AR capabilities, which may include streams of multiple types of data such as RGB images, depth images, IMU (inertial measurement unit) sampling, and inferred scene geometry. This data representation of a virtual space, referred to hereafter as simply AR metadata, is used to determine the position of the mobile computing device (and specifically, the image sensor or camera) relative to visually distinguishing features, objects and/or inferred planes in the images being captured by the image sensor or camera of the mobile computing device. As such, the AR metadata allows the AR mobile application to "pin" objects to a position within the virtual space, so that images of those objects can be properly rendered (e.g., position, skew and size) as superimposed over images of the physical space, thereby giving the end-user the perception that the objects (e.g., superimposed images) are physically present in the physical space.

Consistent with some embodiments, during an AR viewing session, one or more images of a physical space (e.g., a room) in combination with the corresponding AR metadata for that physical space, as captured by the mobile computing device, are communicated to a remote server. By way of example, during the AR viewing session, the end-user may press a button—a physical button of the mobile computing device, or a graphical user interface element presented on the display of the mobile computing device—causing a single still image of the physical space (e.g., a room) to be captured and communicated to the remote server, along with the corresponding AR metadata. Alternatively, with other embodiments, a series of images (e.g., a video stream) may be communicated to the remote server with the corresponding AR metadata. Using the room design application, a room designer can access and view the video stream, and select one (or, more) images from the video stream. In any case, the room designer, using the room designer application executing on a client computing device with access to the remote server, will have shared access to one or more images of a physical space and the corresponding AR metadata that embodies the data representation of the virtual space for the physical space, as the images and AR metadata are being generated by the AR mobile application executing on the end-user's AR-capable mobile computing device. Accordingly, the room designer can select visual content associated with various products available from an online marketplace of products (e.g., furniture and related home furnishings) and then position those products in relation to the virtual space represented by the AR metadata. As a result, during the AR viewing session, the end-user of the AR mobile application is able to view a physical space, augmented with superimposed images of products that have been both selected and positioned by a room designer, who is remote from the end-user.

Consistent with some embodiments of the present invention, the AR application-based room design service provides a collaborative platform via which the end-user can communicate in real-time (e.g., via voice or video call) with a room designer. For instance, while simultaneously sharing an image (or, images) and corresponding AR metadata of a scene, as captured by one or more cameras of the end-user's mobile computing device, the end-user can communicate various product preferences to the room designer. Furthermore, using computer vision and object recognition analysis, the shared image (or, images) received from the end-user's mobile computing device is analyzed to identify objects (and their attributes) present in the image. Accordingly, the information extracted from analyzing an image is used, in combination with explicit and/or inferred end-user preference information, to query one or more databases of products to quickly and efficiently identify products that may be both complementary to those products identified in the image, and suiting the preferences and tastes of the end-user. As such, by interacting with the room design application, the room designer can select and position products within images, as presented on his or her client computing device, such that the positioned products will also appear in a live AR scene as rendered by the end-user's AR-capable mobile computing device. The end-user benefits by having the expertise of the room designer in both selecting appropriate products, and positioning or designing the layout and look of those products in the end-user's room, to coordinate with the existing look of the room.

Consistent with some embodiments of the present invention, the end-user and room designer may collaborate in real time, such that the end-user can communicate product preferences to the room designer over a voice or video call, or in some instances, a messaging application. However, with some embodiments, the collaboration may be asynchronous in nature. For example, the image (or, images) and corresponding AR metadata, as captured by the end-user's AR-capable mobile computing device, may be communicated to and stored at a remote server. A room designer, using the room design application, may subsequently access the previously captured image(s) and AR metadata, select and position one or more products to appear in one or more images, and then save the resulting room design at the server computer. The end-user can then recall the room design as saved on the remote server. Upon initiating a subsequent AR viewing session in the same physical space for which a room designer has saved a room design, the AR mobile application will need to perform a realignment procedure to ensure that the old AR metadata (e.g., as originally shared with the room designer) is consistent with the new AR metadata (e.g., as generated during the current live AR viewing session). Accordingly, this allows the end-user to view the positioned products in a live AR view, at some rime subsequent to when the room designer created the room design.

Consistent with some embodiments, instead of (or, in addition to) requesting the aid of a formally trained room designer, the end-user may invoke a request for help in designing a particular physical space that is directed to one or more members of a social networking service to which the end-user is a member. For instance, subsequent to capturing one or more images of a physical space, and corresponding AR metadata, the end-user may be presented with a content sharing interface that enables the end-user to publish a content posting that includes an image or photo of the physical space for which design help is being requested, along with commentary, to a feed or content stream that is part of a social networking service. The end-user may interact with the content sharing interface to select or otherwise specify a target audience for the content posting, such that members of the target audience will be presented with the end-user's content posting in their respective, personalized feeds or content streams. As an example, the end-user may select or specify as a target audience those members of the social networking service who, by way of having established a formal connection or friendship via the social networking service, are friends or connections with the end-user, or, have joined a particular group (e.g., interest group) within the context of the social networking service, or, the general public (e.g., all members of the social networking service). In yet another example, the end-user may simply identify some subset of friends or connections from whom the end-user would like to request help in designing a room.

With some embodiments, the room design application may have or be integrated with a social networking service. In this context, integrated means that the room design application and the social networking service may be operated by the same entity, and perhaps accessible via a common domain name. For example, the room design application may be provided as one of several services offered via a larger portal or platform that includes social networking services, such that end-user's of the portal form connections with one another, follow various content sources, and otherwise participate in establishing a social graph or content graph that can be used to determine and memorialize relationships between entities (e.g., people, content, etc.). Accordingly, with some embodiments, the tools necessary to access and interact with an end-user's posted image or images may be embedded within a user interface of a social networking feed or similar service that is provided in connection with the room design application. In other embodiments, a request for help in designing a room may be shared with others via a separate content posting interface that is associated with an external social networking service, such that one or more application programming interface (APIs) may be used in exchanging data with the social networking service. In yet another example embodiment, a request for design services may be communicated via any of a number of other communication channels (e.g., messaging services, text message, email, and so forth), such that no formal social networking service is required.

In any case, with some embodiments, when an end-user requests help in designing a room, the end-user's content posting (including the request), as published and presented in a feed or content stream of other members of the social networking service, will generally include an interactive link (e.g., a hyperlink, or similar) which, when selected, will invoke the room design application. For example, by selecting a link associated with the end-user's content posting, the room design application will be invoked, and the member of the social networking service will be presented with an interface for the room design application. With some embodiments, the room design application will be browser based, such that selection of the link will open a browser window via which the room design application will be presented. Generally, the interface will include a presentation of the one or more images of the physical space, as captured by the end-user's mobile computing device. Accordingly, the member of the social network service now acting as a room designer will be able to interact with the one or more images and corresponding AR metadata, representing the virtual space associated with the physical space portrayed in the images, to select products from a marketplace of products, and position those products within the virtual space. Of course, in some embodiments, the link may invoke an application other than a web browser, such as a mobile application executing on a mobile computing device.

Consistent with some embodiments, the interactive link to invoke the room design application may be shared via any of a wide number of messaging applications (e.g., beyond those explicitly associated with social networking services), to include text or SMS messaging applications, email applications, group messaging services, and so forth. Accordingly, the end-user can request help in designing a room via any of a wide variety of messaging and communication channels by simply sharing a link, which, when selected will invoke the room design application and provide access to the end-user's project. With some embodiments, multiple room designers may have access to a single instance of an end-user's project (e.g., image or images and corresponding meta-data), such that each of several room designers may collaborate. In such a scenario, changes made or objects added to the virtual space by one room designer will be viewable not only by the end-user, but also by any other room designer who has received the request to help in designing the room. Accordingly, with some embodiments the end-user can, in generating the request for design help, establish various access or authorization privileges that will determine who has the ability to view and design a particular instance of the virtual space. Accordingly, in some instances, the end-user may desire to have multiple room designers providing separate room designs, such that each room designer has access to a separate instance of the virtual space, and in other instances, the end-user may request that multiple room designers collaborate in a single instance of the virtual space, such that each room designer having access or authorization will share access to the same instance of a virtual space.

Subsequent to requesting and receiving help from other room designers, the end-user is able to select a particular room design from all room designs that have been created and saved (e.g., on a remote server) by the end-user's connections or friends. Accordingly, the end-user can then recall a room design as saved on the remote server by a friend or connection. Upon initiating a subsequent AR viewing session in the same physical space for which a connection or friend has saved a room design, the AR mobile application will need to perform a realignment procedure to ensure that the old AR metadata (e.g., as originally shared) is consistent with the new AR metadata (e.g., as generated during the current live AR viewing session). Accordingly, this allows the end-user to view the positioned products in a live AR view, at some time subsequent to when the room designer, connection or friend, created the room design. With some embodiments, the end-user can very quickly and efficiently select one room design from a list of many, to compare the various products and their relative positioning within the AR space. Of course, with some embodiments, the end-user can view the room designs that others have created, using the original images captured and shared by the end-user. In this scenario, the room design can be viewed from any location—the end-user need not be in the same physical space where the original images were captured. Other aspects of the present inventive subject matter will be readily ascertainable from the description of the figures that follow.

FIG. 1 is an illustration showing a scene (e.g., room 100) that is being rendered by an AR-capable mobile application executing on a tablet computer 102 and augmented with an image of a coffee table 104 that has been selected and placed in the AR view of the room by a room designer (not shown) operating a client computing device 106 that is remote from the room 100 and tablet computer 102, consistent with some embodiments of the present invention. In this example, the end-user 108 is interested in purchasing a coffee table for his room 100. Using an AR application-based room design service, the end-user 108 initiates, via a mobile application executing on his tablet computer 102, a design consultation session with a remote room designer. When the session is initiated, one or more images from the live scene are captured by the one or more image sensors of the tablet computer and communicated over a network in real time to a remote server 107. In addition to the one or more images, the tablet computer 102 communicates to the remote server 107 AR metadata that corresponds with the physical space captured in the one or more images. Generally, the AR metadata is derived via input received via the tablet computer's motion sensing hardware and/or computer vision analysis. The AR metadata allows for the creation of a correspondence between the real-world physical space that the end-user inhabits and a virtual space (generally referred to as AR space) in in which visual content can be modeled. This combination of an image and its associated AR metadata allows the room designer, using the room design application presented on the client computing device 106 to properly position products in the image (or, images) so that the product images will appear realistic in a live AR view of a scene as rendered by an end-user's tablet computer 102.

As illustrated in FIG. 1, with some embodiments, the AR application-based room design service may be integrated with one or more social networking services, thereby allowing content generated by end-users to be shared quickly and easily via one or more publishing or messaging services provided by the social networking service(s). As an example, an end-user may publish a content posting with a design request to the feed of a social networking service, such that other members of the social networking service will receive the content posting in their respective personalized feeds. Similarly, an end-user may simply direct a message, with a design request, to another member, via the social networking service. In any case, being integrated with a social networking service allows end-users of the design service to target other people for help in designing a room and/or other physical space.

By way of example and with reference to FIG. 1, the room designer has selected a particular coffee table from a list of recommended products. As will be described in greater detail below, the ranked list of products presented to the room designer is generally generated algorithmically taking as input a variety of input signals, including but by no means limited to the following: information about products (and their attributes) obtained from the one or more images captured by the end-user's mobile computing device; historical tracking data that is derived from the end-user's interactions with various applications and services, such as, a product search history for an online marketplace, products that have been selected and placed in an AR scene by the end-user, products that have previously been purchased or saved to a wishlist, products (and their attributes) that appear in photographs of rooms or spaces that the end-user has saved to a list of favorites or added to an "ideabook", and so forth. After selecting the coffee table, by interacting with the user interface presented via client computing device 106, the room designer has positioned the coffee table in the AR scene, and submitted the room design to the server 107. In this instance, the room design amounts to the visual content representing the selected product (coffee table) and the information identifying its position in AR space. From the server 107, this information is either pushed to the end-user's AR mobile computing device 102, or sent to the AR mobile computing device 102 in response to the mobile computing device 102 polling or requesting an update. In any case, upon receiving the information, the live AR scene presented on the end-user's tablet computer 102 is rendered to include the image of the coffee table 104, even though the actual coffee table is not present in the room 100.

As illustrated in FIG. 1, the remote server 107 includes, or otherwise has access to, a database storing social graph data 109 for a social networking application or service. Consistent with some embodiments, the remote server 107 is integrated with one or more social networking applications and/or services. For instance, the social networking service may be hosted by the same entity (and thus, same servers) that provides the room design application. However, with some alternative embodiments, one or more externally hosted social networking services are integrated to operate in connection with the room design application. The social graph data 109 represents the data indicating the relationships that have been established between members of a social networking application or service.

Consistent with some embodiments of the present invention, the end-user 108 may select a target audience from members of a social networking service to whom the images of the room are to be shared, along with a request for assistance in creating a room design for the room 100. For example, subsequent to capturing the one or more images of the room 100, and the corresponding AR metadata, the end-user 108 may be presented with a content sharing interface, via which the end-user 108 selects or otherwise specifies a target audience from whom the end-user would like help in creating a room design. With some embodiments, the target audience will be selected from members of a social networking service, based on the social graph data 109. For example, the end-user 108 may elect to share the design request with all, or some subset, of his connections or friends, as formally memorialized by the social graph data 109 and the social networking service. Accordingly, those members of the social networking service who are selected by the end-user to receive a request for help in designing the room will be presented with a content posting in their respective personalized feeds. The content posting may include an image of the room, as well as information relating to the end-user's request. For instance, the end-user may specify various parameters—such as the particular furniture elements to be included, preferred styles, colors and/or color schemes, and so forth. Via this content posting, the members of the social networking service can invoke the room design application and then select and position products in the same manner as done by a formally trained room designer.

Accordingly, as described and illustrated herein, the end-user 108 can leverage his or her social network, as defined by one or more social networking services, to obtain help in creating various room designs.

Figure 2:
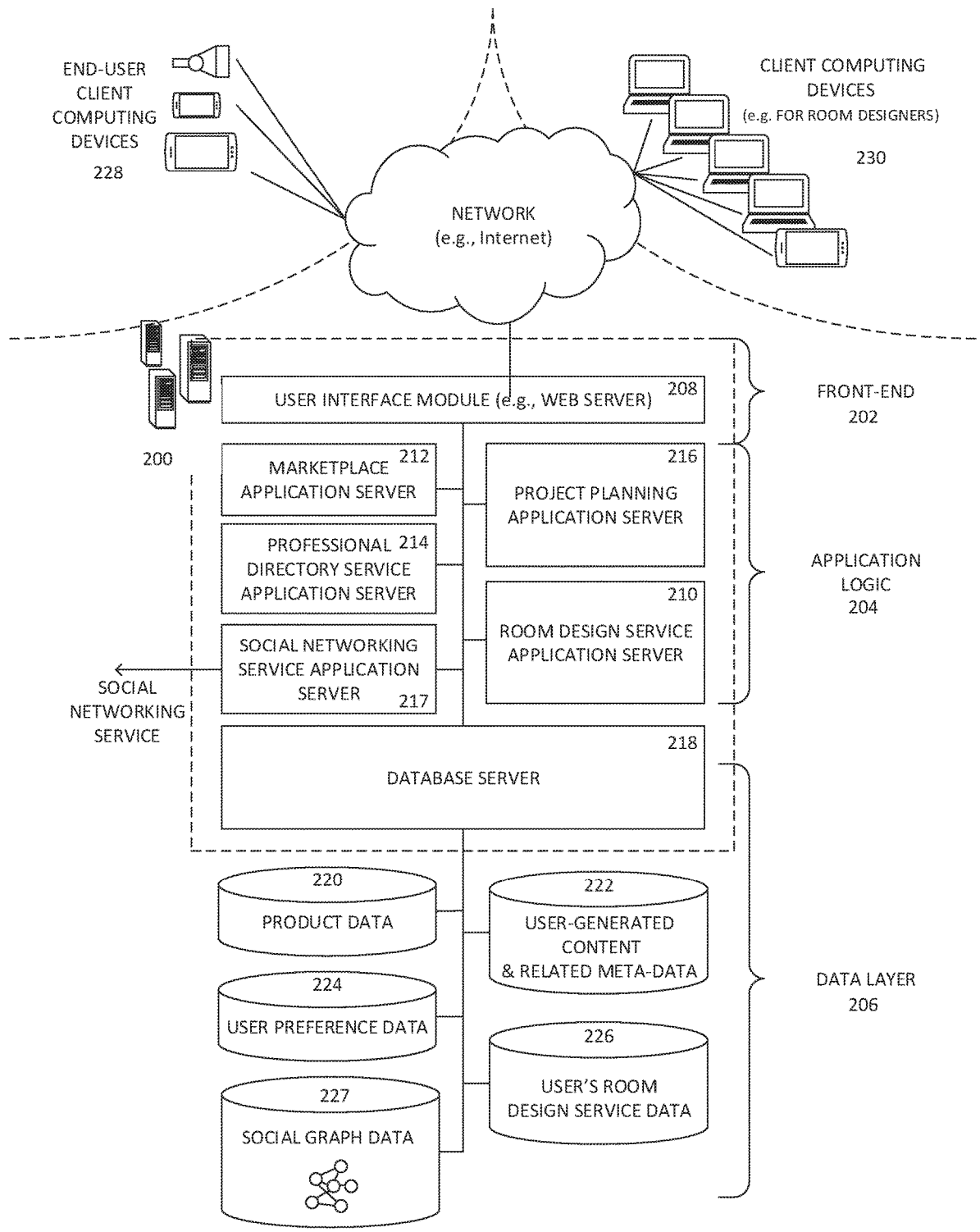
FIG. 2 is a system diagram illustrating various components of a system providing end-user applications and services, and with which a room design service application may be integrated, consistent with some embodiments of the invention.

FIG. 2 is a system diagram illustrating an overall architecture and various components of a system 200 providing end-user applications and services, and with which an AR application-based room design service may be integrated, consistent with some embodiments of the invention. The various components illustrated in FIG. 2 may be embodied in hardware, software, or a combination of hardware and software, and similarly, the various components may be part of a single server computer system, or, may be part of a distributed system of networked computers. With some embodiments of the present invention, an AR application-based room design service may be one of a variety of applications and/or services offered and accessed in connection with an online platform or portal, having a website, one or more mobile applications, and being devoted to architecture, interior design and decorating, landscape design and home improvement. The system 200 illustrated in FIG. 2 is presented as an example of the type of system via which such an online platform or portal may be implemented. As illustrated in FIG. 2, the system 200 consists of three layers, a front-end layer 202, an application logic layer 204, and a data layer 206.

The front-end layer 202 generally consists of a user interface module (e.g., a web server 208), which receives requests from various client-computing devices, and communicates appropriate responses to the requesting client devices. For example, the user interface module(s) 208 may receive requests in the form of Hypertext Transport Protocol (HTTP) requests, or other web-based, application programming interface (API) requests. In general, end-users interact with the system 200 using any one of a variety of AR-capable mobile computing devices 228, such as mobile phones, tablet computers, head-mounted displays and/or glasses with a built-in heads-up display. Similarly, with some embodiments, a team of room designers may interact with the system 200 via client computing devices 230, which may be desktop or laptop computers, or mobile tablet computers, or any similar device.

The application logic layer 204 includes various application servers, which, in conjunction with the user interface module(s) 208, generate various user interfaces with data retrieved from various services and data sources in the data layer 206. Consistent with some embodiments, each application server is a server program (e.g., software instructions) executed by a server computer, or distributed network of computers, that provide the application or business logic for the corresponding application. With some embodiments, individual application servers are used to implement the functionality associated with various applications, services and features of the various application programs provided via the portal or platform. For example, and as illustrated in FIG. 2, the application-based room design service is implemented with one application server 210, while other applications are shown to be implemented with separate application servers (e.g., the marketplace application server 212), and so on. Accordingly, a variety of other applications or services (not shown) that are made available to end-users of the online platform or portal may be embodied in their own application servers.

Generally, the data layer 206 includes one or more database servers 218 for writing data to and reading data from one or more databases (e.g., databases with reference numbers 220, 222, 224 and 226). Consistent with some embodiments, each application server will access data services of the data layer 206, as necessary, to generate the appropriate user interfaces and content for presentation to the end-users and/or room designers. Accordingly, one database 220 stores data relating to products available via the online marketplace. In addition to the conventional product attributes (e.g., price, dimensions, color, brand, inventory and product availability, shipping information, and so on), the product data may include references to user-generated content (e.g., photographs) in which each product appears. For example, the database with reference number 222 stores user-generated content and related metadata. With some embodiments, end-users, and in particular, service professionals in the home building, renovation and design services industry, can post photographs of their work product. These photographs may be algorithmically and/or manually analyzed and tagged with metadata that includes information about the photographs. Accordingly, an end-user interested in a product appearing in the marketplace may be presented with an image of the product appearing in a photograph submitted by a professional designer, thereby giving the end-user a sense of the product in a professionally designed environment.

The database with reference number 224 stores data relating to inferred and/or explicitly provided preference information of the end-user. For instance, with some embodiments, one or more applications may prompt an end-user for information about his or her preferences (e.g., architectural or design styles, favorite colors or fabrics, price points, and so forth). Additionally, with some embodiments, each interaction that an end-user has with an application or service may be monitored and tracked, such that information obtained from the interactions can be used to infer preferences of the end-user. By way of example, if an end-user performs various product searches via the marketplace, the end-user's query (e.g., search string) and the end-user's selections from the provided search results may be used to infer end-user preferences. Similarly, if the end-user interacts with (e.g., views, saves, shares, adds to a list of favorites, etc.) certain photographs, information obtained from those photographs may be used to infer end-user preferences.

The data layer 206 includes a database 226 for storing information relating to the room designs generated by room designers via the room design application service. For example, each time an end-user initiates a design consultation request, the request is processed by a room designer. The room designer may generate one or more room designs, with each room design including a selection of one or more products, and information as to where the one or more products are to appear in AR space, in accordance with the image or images and AR metadata received from the end-user's mobile computing device. This information is stored in the database with reference number 226, thereby allowing an end-user with the ability to recall various room designs that have been saved by a room designer. Recalling a saved room design will result in information being communicated from the server to the end-user's mobile computing device, where the AR-capable mobile application will process the information to render images of products superimposed over a live AR view of a room or scene, in accordance with the information received from the server.

As referenced above, in addition to the room design application service 210, the system 200 illustrated in FIG. 2 is shown to include a marketplace application server 212. Accordingly, with some embodiments of the invention, the AR application-based room design service operates in connection with an integrated online marketplace, having a variety of information about products, including but not limited to, furniture, home furnishings, landscaping and home renovation products, and related goods. Each product available via the marketplace may be associated with a wide variety of product attributes, associated with and/or describing the product. Accordingly, when searching for products, these product attributes can be used as search and filtering criteria.

With some embodiments, the system may provide one or more project planning application servers. A project planning application may include an online space for storing and accessing user-generated content (e.g., photographs). For example, a project planning application may support the creation of lists or "ideabooks" via which end-users can generate and store a personally curated collection of favorite photographs.

As shown in FIG. 2, the system includes a room design application server 210. This application server 210 facilitates the room design application used by room designers to select and position products for presentation on end-users' AR-capable mobile computing devices. The room design application is described in greater detail below, in connection with the description of FIG. 3.

Finally, with some embodiments of the present invention, the room design service may be integrated with one or more social networking services. An integrated social networking application and service may be hosted by the same entity that is providing the room design service, in which case the various computer servers hosting the room design service may also be used to host the social networking service. Alternatively, the integration of the social networking service may be such that the social networking service is an externally hosted service—that is, hosted by an entity that is separate from that hosting the room design service. In such an instance, the system may leverage one or more public or private application programming interfaces (APIs) to exchange information with the third-party social networking service, or services.

Figure 3:
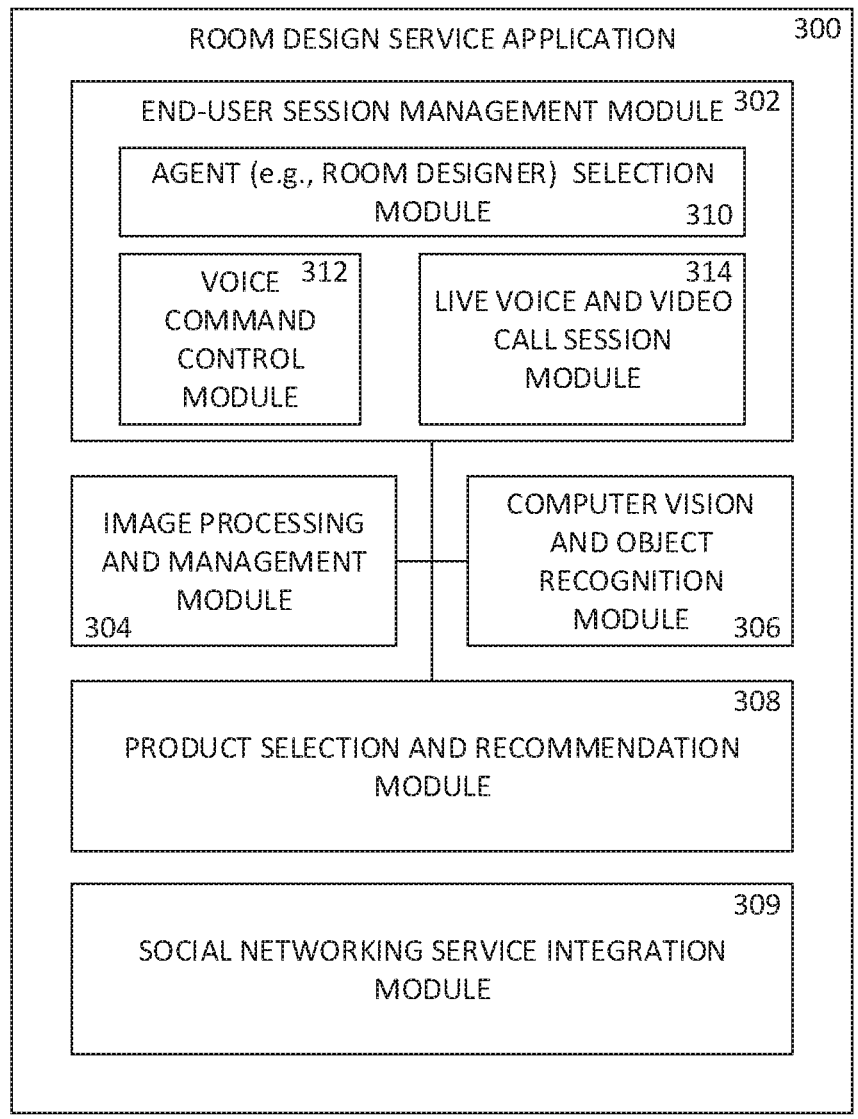
FIG. 3 is a system diagram illustrating the various functional components that comprise a room design application server that facilitates the remote selection and placement, by a room designer, of objects (e.g., visual representations of products) in an AR view of an end-user's AR-capable mobile application, consistent with some embodiments of the present invention.

FIG. 3 is a system diagram illustrating the various functional components that comprise a room design application service that facilitates the remote selection and placement, by a room designer, of visual content in an AR view of an end-user's AR-capable mobile application, consistent with some embodiments of the present invention. As illustrated in FIG. 3, the room design application service 300 includes an end-user session management module 302, an AR image processing and management module 304, a computer vision and object recognition module 306 and a product selection and recommendation module 308.

As its name suggests, the end-user session management module 302 manages end-user sessions, for example, by establishing connections between resources of the system 200 and the end-user mobile computing devices 228 and client computing devices 230 of the room designers. For example, when an end-user initiates a design consultation request, the session management module creates a record identifying the end-user from whom the request was received. Any room designs that result, from the request, are stored in association with this record, so as to identify any saved room designs associated with the end-user, and the particular request from the end-user.

Consistent with some embodiments, when an end-user initially requests help from a member of a room design team, the initial request includes information identifying the end-user. As an example, the request may occur subsequent to the end-user having authenticated him- or herself, by providing a username and password. In any case, upon receiving the request the agent selection module 310 retrieves end-user preference data for the particular end-user, and uses this end-user preference data to assign the request to an appropriate room designer, e.g., based on information associated with the expertise or preferences of each room designer. For instance, each room designer may have a profile that includes information about his or her expertise, preferred styles, and so forth. Similarly, in some instances, a design consultation request may be associated with a preferred pricing level (e.g., high, low medium, or, "$", "$$", "$$$"). Accordingly, the selection of a room designer may be made in part based on the experience level that a room designer has at the specified or preferred price level.

With some embodiments, the session management module 310 includes a live voice and video call session module 314. This module 314 processes requests for live connections between end-users and room designers, ensuring that the respective devices are connected for the purpose of having live voice or video calls. With some embodiments, the end-user's AR-capable mobile application may support voice command control. Accordingly, an end-user can speak commands, which are captured at the end-user's mobile computing device and processed by the voice command control module 312 of the room design service application 300. By way of example, an end-user who is viewing a superimposed image of a coffee table in a live AR view may speak commands, such as, "show me the glass top table" or "show me this table in walnut." These commands are communicated from the end-user's mobile computing device to the room design application server 300, where the voice command control module 312 processes the command, and generates an appropriate response. An appropriate response is highly dependent upon the context, but generally may involve obtaining the relevant requested information, and communicating the same to the mobile computing device so that any superimposed images may be updated to reflect different images that are consistent with what has been requested by the end-user.

Consistent with some embodiments, the image processing and management module 304 receives individual images, or in some instances a series of images or video stream, from an end-user's mobile computing device, and then stores the images or video stream and/or relays the images or video stream in real time to a client computing device in operation by a room designer. In addition to handling images, the image processing and management module 304 receives and stores AR metadata associated with any received images. As such, the image processing and management module 304 receives the information necessary to construct a shared representation of an AR scene. Accordingly, when a room designer interacts with the images by positioning an image of a product, the image is "tied" to the virtual space (AR space), as represented by the AR metadata, and thus, when the corresponding object is rendered in AR space on the end-user's mobile computing device, the object will maintain its position and orientation relative to the real-world scene.

With some embodiments, the room design service application 300 includes a computer vision and object recognition module 306. This module 306 accesses images from an AR image stream and processes these images to identify objects and their attributes, as those objects appear in real-world scenes (e.g., rooms). As an example, the output of this analysis, for a given image or set of images, may be used to identify the type of furniture in a room (e.g., a sofa, chair, rug, wall art, and so forth), the size, color and materials (e.g., wood, metal, glass, fabric) of the furniture, and many other relevant attributes. These attributes can then be used by the product selection and recommendation module 308 to generate a list of top recommended products to a room designer, where such products (e.g., images or 3D renderings) can be placed in AR space for rendering in two dimensions in a live AR view on an end-user's AR-capable mobile computing device. As an example, the product selection and recommendation module 308 may use the attributes identified by the object recognition module 306, along with other information, such as end-user preference data, to generate queries which are executed against a database of products.

As an example, with some embodiments, the object recognition module may output a count of the type of each object identified in a room—e.g., one sofa, one side table, three lamps, two vases, two rugs, a television stand, and so forth. This information may be used to identify one or more types of objects (e.g., additional furniture items or home furnishings) that normally appear together, as evidenced by analyzing photographs submitted by professionals. Accordingly, if a particular type of object tends to appear together with another type of object or sets of objects, but the object recognition module 308 does not identify that type of object in a given room, that particular type of object may be one that is recommended to the room designer for placement in an end-user's real-world space. Accordingly, a query will automatically be built to query a database of products and thereby populate a list of recommended products that is presented to the room designer, where the list includes items from that type.

In another example, the attributes of the objects identified by the object recognition module 306 may be used to identify products having similar attributes. For example, if the object recognition analysis indicates that an end-user has a furniture item that is from a particular designer or brand, this information may be useful for querying the product database to find other products that will complement those identified in the end-user's room, via the image analysis.

Figure 4:
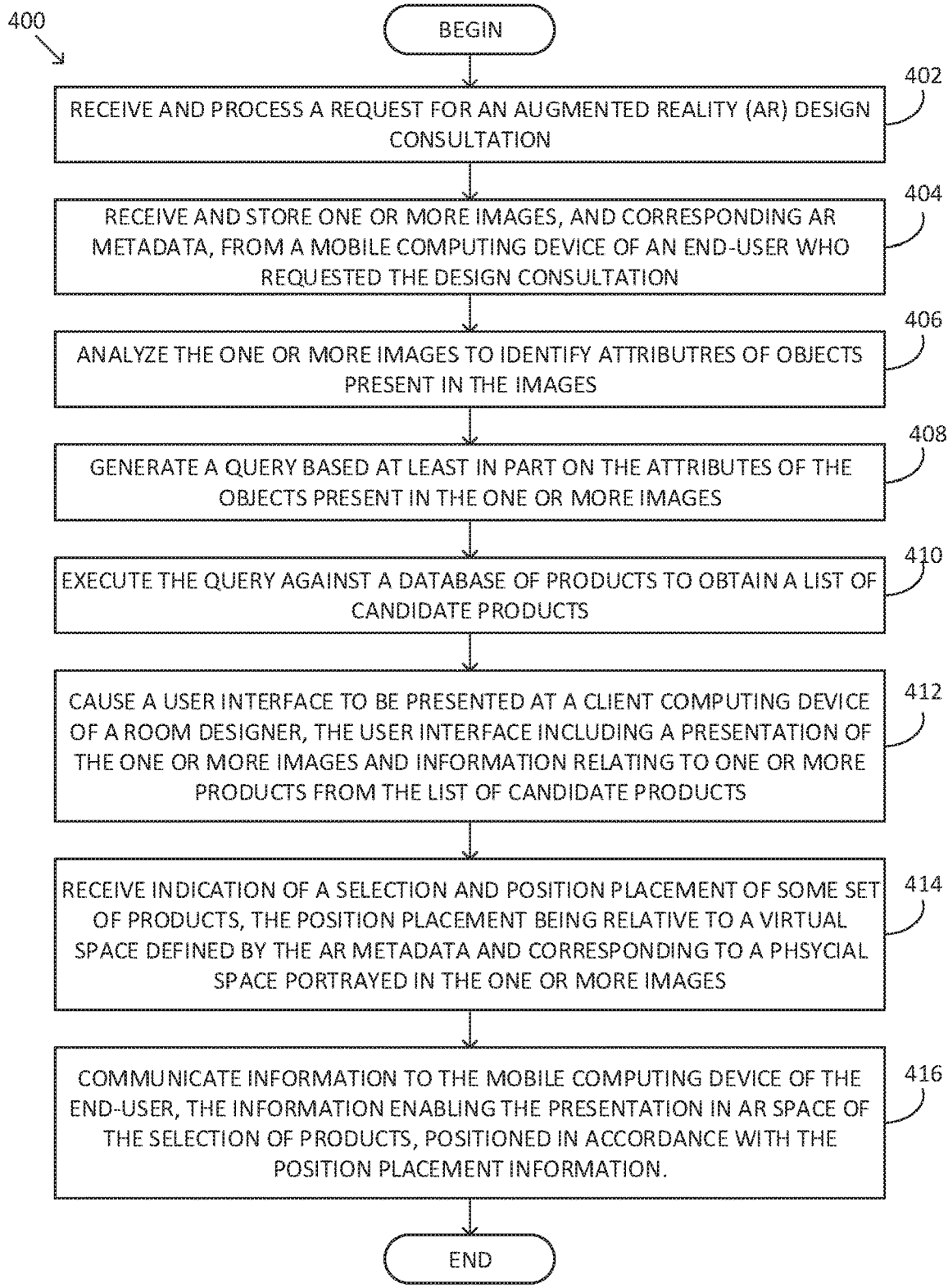
FIG. 4 is a flow diagram illustrating the various method operations that occur when generating various user interfaces to present objects (e.g., home furnishings and related products) to a room designer, for selection and placement in an AR view of an end-user's AR-capable mobile application, according to some embodiments of the present invention.

FIG. 4 is a flow diagram illustrating the various method operations that occur when generating various user interfaces to present items (e.g., home furnishings and related products) to a room designer, for selection and placement in an AR view of an end-user's AR-capable mobile application, according to some embodiments of the present invention. Consistent with some embodiments, at method operation 402, an end-user initiates an AR application-based design consultation with a remote room designer by interacting with an AR application on his or her mobile computing device, and selecting a user interface object via a touch screen display of the device. By way of example and with reference to FIG. 5, the mobile application may present a variety of buttons (such as button 506 in FIG. 5, with label "Request AR Design.") Selection of this button 506 causes the end-user's mobile computing device to generate a design consultation request that is communicated to a server.

Next, after processing the design consultation request and allocating the request to an appropriate designer, a method operation 404, the server receives and stores an image (or, images), and corresponding AR metadata, as captured or derived with a camera and other sensors on the end-user's mobile computing device. The AR metadata generally consists of a data representation of a virtual space that corresponds with a real-world physical space presented in the one or more images.

Next, at method operation 406, the images received at the server may optionally be analyzed by a computer vision and object recognition module (e.g., such as that shown in FIG.

3 with reference number 306). The object recognition analysis will yield output in the form of attributes of objects identified in the images.

At method operation 408, a query is generated using, in part, attributes of the objects present in the images received at the server, from the end-user's mobile computing device. At method operation 410, the query is executed against a database of products to identify a set of candidate products. With some embodiments, the candidate products may be further ranked and/or filtered, to generate a ranked list of candidate products.

At method operation 412, the server causes a user interface to be presented at a client computing device of a room designer. The user interface includes a presentation of the one or more images as well as information concerning the virtual space that corresponds with the real-world space presented in the images. The user interface additionally includes a list of top recommended products that the room designer might consider for selection and placement in the virtual space (AR space) that corresponds with the real-world space.

Using the design application, the room designer will manipulate the images of the recommended products by positioning the images of the products, overlaid on one or more of the images of the physical space. By positioning the images in this manner, the room designer is identifying the position of the products in virtual space, and thus effecting how—specifically, where—the images of the product will appear when rendered on the end-user's AR-capable mobile computing device. Accordingly, at method operation 414, the server receives an indication of a selection and position placement of some set of products, of which, some may be from the set of candidate products. The position information derived from the placement of the images via the user interface presented to the room designer is stored in association with images of the products, at the server.

Finally, at method operation 416, the information about the products and their position in virtual space (AR space) are communicated to the AR application executing on the end-user's mobile computing device, where, when the end-user views the space using the AR application, the live AR view of the space will include the presentation of the products, as selected and positioned, by the room designer using the room design application.

Figure 5:
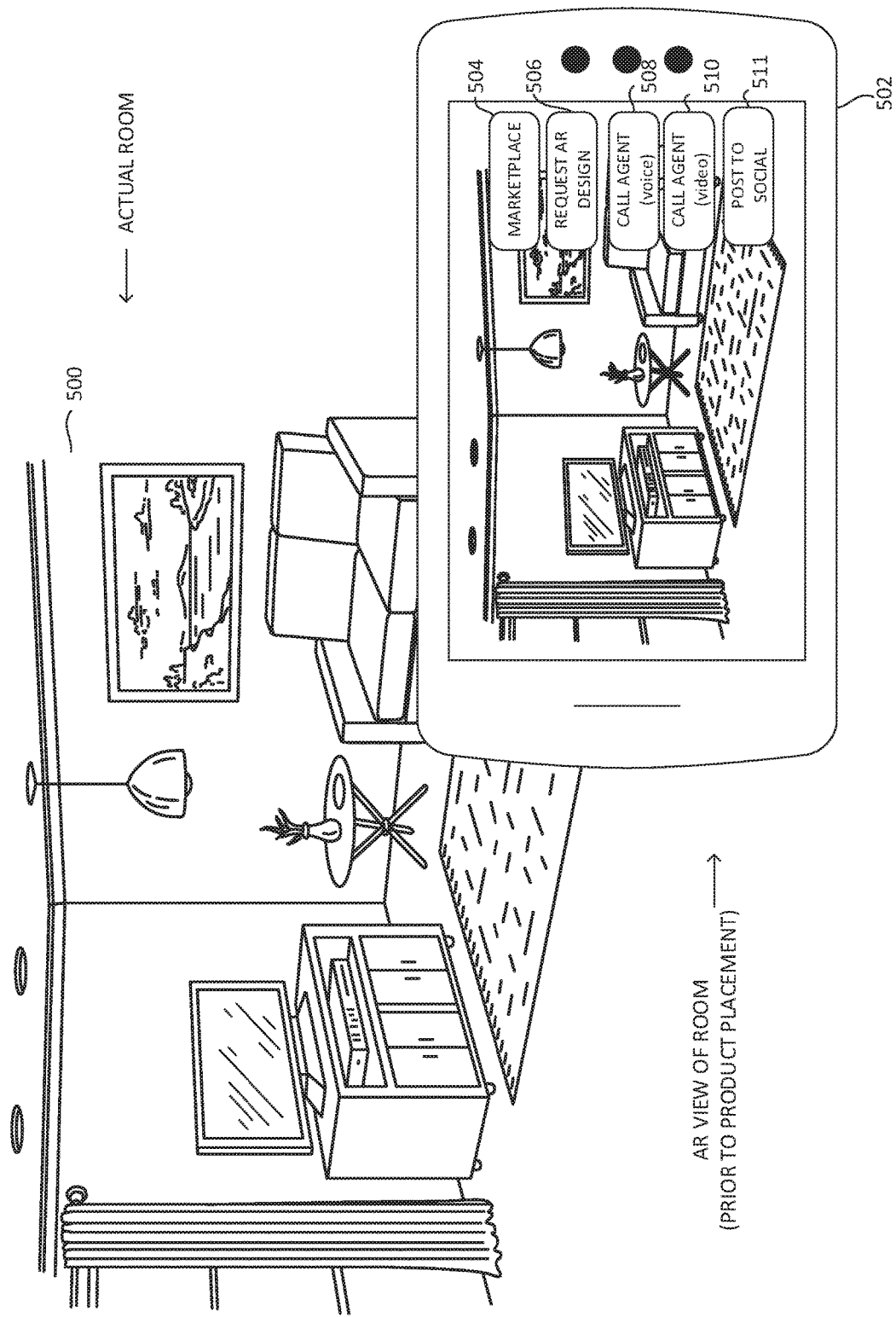
FIG. 5 is a user interface diagram illustrating an example of a user interface for an AR-capable mobile application that provides one or more user interface control elements (e.g., buttons) to initiate a room design consultation, consistent with embodiments of the present invention.

FIG. 5 is a user interface diagram illustrating an example of a user interface for an AR-capable mobile application that provides one or more user interface control elements (e.g., buttons) to initiate a room design consultation, consistent with embodiments of the present invention. In this example, the end-user's mobile computing device 502 is executing an AR-capable application. The AR-capable application is rendering a live view of the end-user's room. As illustrated in FIG. 5, the mobile computing device 502 is presenting a user interface that includes several user interface control elements (e.g., buttons). A first button, labeled, "Marketplace", provides the end-user with access to an online marketplace of products. Although not shown here, consistent with some embodiments of the invention, products accessed via the online marketplace can be placed, by the end-user, in a live AR view of a real-world scene. Accordingly, the end-user can select and position products on his or her own, if desired. However, in the case that the end-user would like the help of a professional room designer, the mobile application includes several options for requesting such help. For example, as illustrated in FIG. 5, the button 506 with the label, "Request AR Design" provides the end-user with a means to initiate a design consultation request. By selecting this button 506, a request will be communicated from the end-user's mobile computing device 502 to a server, where the request will be processed, and assigned to an appropriate room designer. With some embodiments, upon selecting the button 506, the end-user may be prompted to hold his or her mobile computing device in a manner that will capture, with the camera of the device, the room or scene for which the end-user would like assistance in designing.

With some embodiments, design consultation requests are processed in real time, such that the request will be relayed to an appropriate room designer, and the room designer will immediately begin the process of selecting and positioning products for the end-user. However, with some embodiments, the request may be processed asynchronously. Accordingly, the end-user may be prompted to capture the scene with the camera of his or her mobile computing device 502, and then specify any design parameters (e.g., price point, style, etc.) The end-user may then be notified of a subsequent time at which the room design will be completed and made available for viewing in AR via the mobile computing device.

As illustrated in FIG. 5, two additional buttons (e.g., buttons 508 and button 510) provide the end-user with the option for collaborating with a room designer in real time, for example, via a voice call or a video call. For instance, by selecting the button 508, with the label, "Call Agent (Voice)", the end-user can initiate a voice call to speak with a room designer, while the room designer is receiving and viewing one or more images (or, a video stream) of the end-user's room, as captured and transmitted by the end-user's mobile computing device 502. Accordingly, this allows the end-user to discuss with the room designer his or her preferences. The room designer can then select and position products in an iterative manner, requesting the end-user's feedback in real time. Similarly, the button 510 with the label, "Call Agent (video)" provides the end-user with the option of initiating a video call with the room designer assigned to process his or her design consultation request. As such, a front-facing camera—that is, a camera that is on the same side of the mobile computing device 502 as the touch-enabled display—will capture images of the end-user, which are communicated to the client computing device of the room designer for presentation to the room designer. Similarly, the client computing device of the room designer will transmit video/audio to the end-user's mobile computing device 502.

Figure 6:
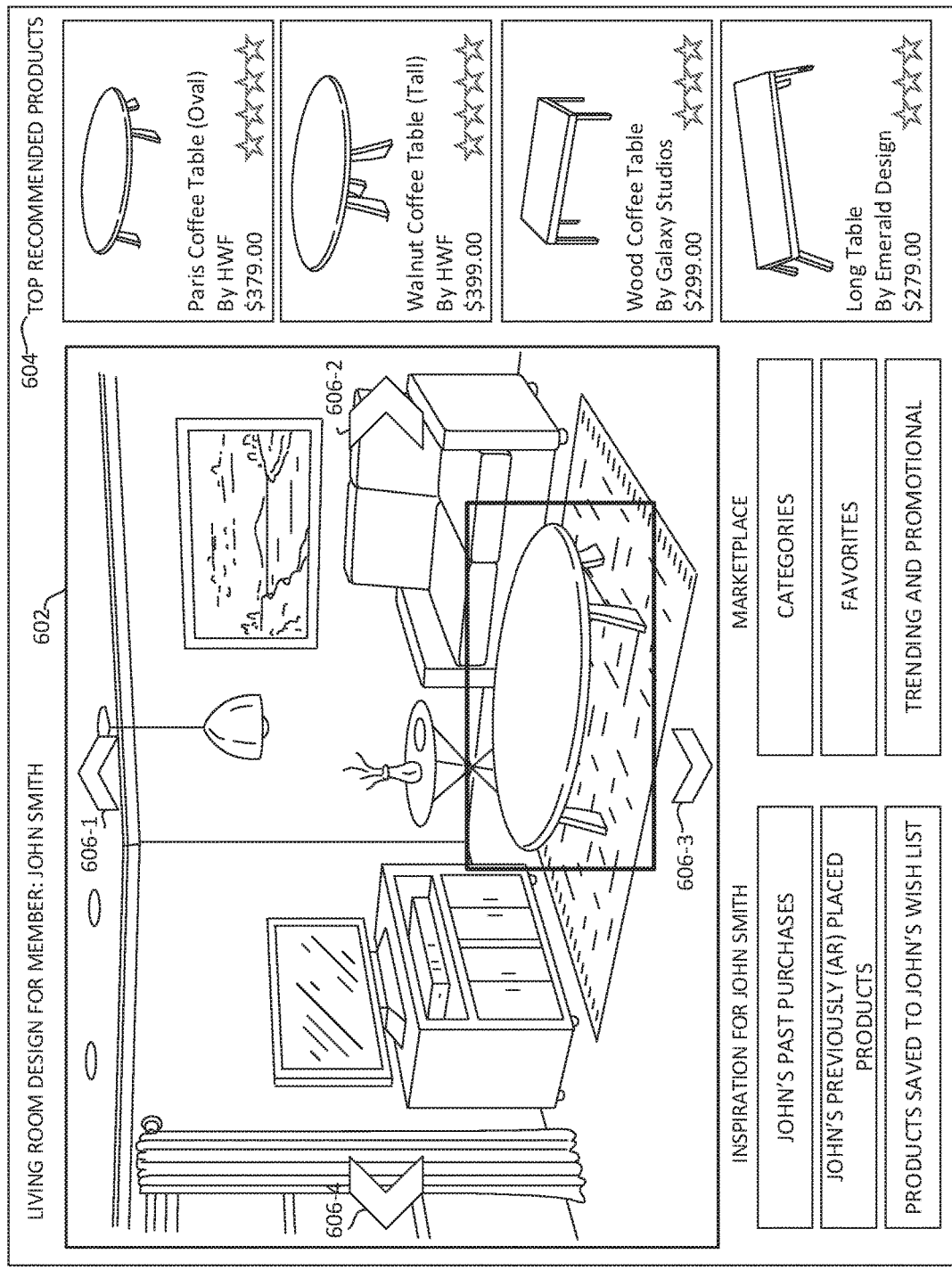
FIG. 6 is a user interface diagram illustrating an example of a user interface for a design application, via which a room designer selects and positions objects, such that a visual representation of those objects will appear in a live AR view at an end-user's AR-capable mobile computing device, consistent with some embodiments of the present invention.

FIG. 6 is a user interface diagram illustrating an example of a user interface for a design application, via which a room designer selects and positions items, such that those items will appear in an AR view at an end-user's AR-capable mobile computing device, consistent with some embodiments of the present invention. As illustrated in FIG. 6, the user interface 600 includes a first module or panel 602 for presenting images of a room or scene, as captured by a remote camera of an end-user's mobile computing device. With some embodiments, a single still image (e.g., photograph) may be presented in the panel 602. In other embodiments, the presentation of the real-world scene may be a series of images (e.g., a video), which may have been previously captured and recorded, or may in some instances be a live image stream relayed in real time from the end-user's mobile computing device. The images that are presented in the panel 602 are associated with AR metadata, allowing the room designer to position products in a shared AR space. With some embodiments, an image may be a wide-angle image, panorama image, or even an image captured in three-hundred sixty degrees. As shown in FIG. 6, with some embodiments, the room designer may be able to navigate the image or images using navigation controls, such as those shown with reference numbers 606-1, 606-2, 606-3 and 606-4 in FIG. 6. Although not shown in FIG. 6, with some embodiments, the navigation controls may also include those for playing, pausing, rewinding, etc., a sequence of images or a video stream, and selecting one or more particular images from the sequence or video stream.

In addition to the first panel 602, the user interface of the design application includes a list of top recommended products 604. Consistent with some embodiments, this list of recommended products is algorithmically derived using a variety of information obtained from the image or images received from the mobile computing device of the end-user, as well as end-user preference information—both inferred, and as explicitly stated by an end-user. As shown in this example, the list of recommended products includes a variety of coffee tables. The room designer has positioned the top recommended coffee table in the image shown in panel 602. Consistent with some embodiments, once a product has been positioned in an image, the information about the product and its positioning in AR space associated with the real-world physical space, is communicated to the end-user's mobile computing device, thereby enabling the AR application on the end-user's mobile computing device to render the real-world scene including the superimposed image of the coffee table, positioned properly in AR space. While this example shows the positioning of a single product, it will be readily appreciated that an entire room, with any of a wide variety of products, could be designed and presented in AR space in this manner.

As illustrated in the example user interface of FIG. 6, the room designer is presented with some additional menu options. For instance, with some embodiments, the room designer may be presented with information that will help the room designer select products that are most likely to be of interest to the end-user, based on the end-user's tastes and preferences. As shown in FIG. 6, one menu option or button is labeled, "John's Past Purchases". By selecting this option, the room designer will be presented with information about the end-user's previously purchased products. As such, by viewing the end-user's past purchases, the room designer may get a sense of the end-user's overall style preferences, and/or be able to select products that complement specific past purchases.

In addition to past purchases, one option provides the room designer with the ability to view products that the end-user (John, in this example) has positioned in AR space, either in the same room as that being presented in panel 602, or another room or space. For example, by selecting the button with the label, "John's Previously (AR) Placed Products", the room designer will be presented with a list of products that the end-user (John) has previously viewed in AR space. For instance, if John has viewed and placed one or more coffee tables in a room, using the AR application to view the room with the selected tables, the room designer may get a sense of what coffee table the end-user likes, or perhaps does not like.

Finally, a third menu option—the button with label, "Products Saved to John's Wishlist"—provides the room designer with the ability to view products that the end-user has saved to a wishlist or list of favorites, or, in some instances, added to a project plan or "ideabook".

In the example of FIG. 6, all of the recommended products are coffee tables. This may be the case, as a result of the end-user explicitly indicating that he is looking only for a coffee table. Alternatively, the computer vision and object recognition analysis that is performed on the various images received from the end-user's mobile computing device may have determined that the room contained objects of a type (e.g., sofa, rug, hanging lamp, wall art, television stand, etc.) that typically are presented with a coffee table, when no object was recognized as a coffee table. In any case, the room design application provides further menu options providing the room designer with selecting additional and different products from the online marketplace, for positioning in AR space, for viewing by the end-user. As shown in FIG. 6, the button with label, "Categories", provides the room designer with the ability to select a category of products from the online marketplace. Accordingly, if the room designer prefers a different category of product, the room designer can select a different category and be presented with other products for positioning in AR space. Similarly, if the room designer has a list of favorite products, that list is accessible via the button with the label, "Favorites". Finally, if certain products are trending in the marketplace—that is, if a particular product is being purchased at a high frequency rate—or, if certain products are subject to promotion for one reason or another, a list of such products can be obtained by the room designer by selecting the button with the label, "Trending and Promotional".

Figure 7:
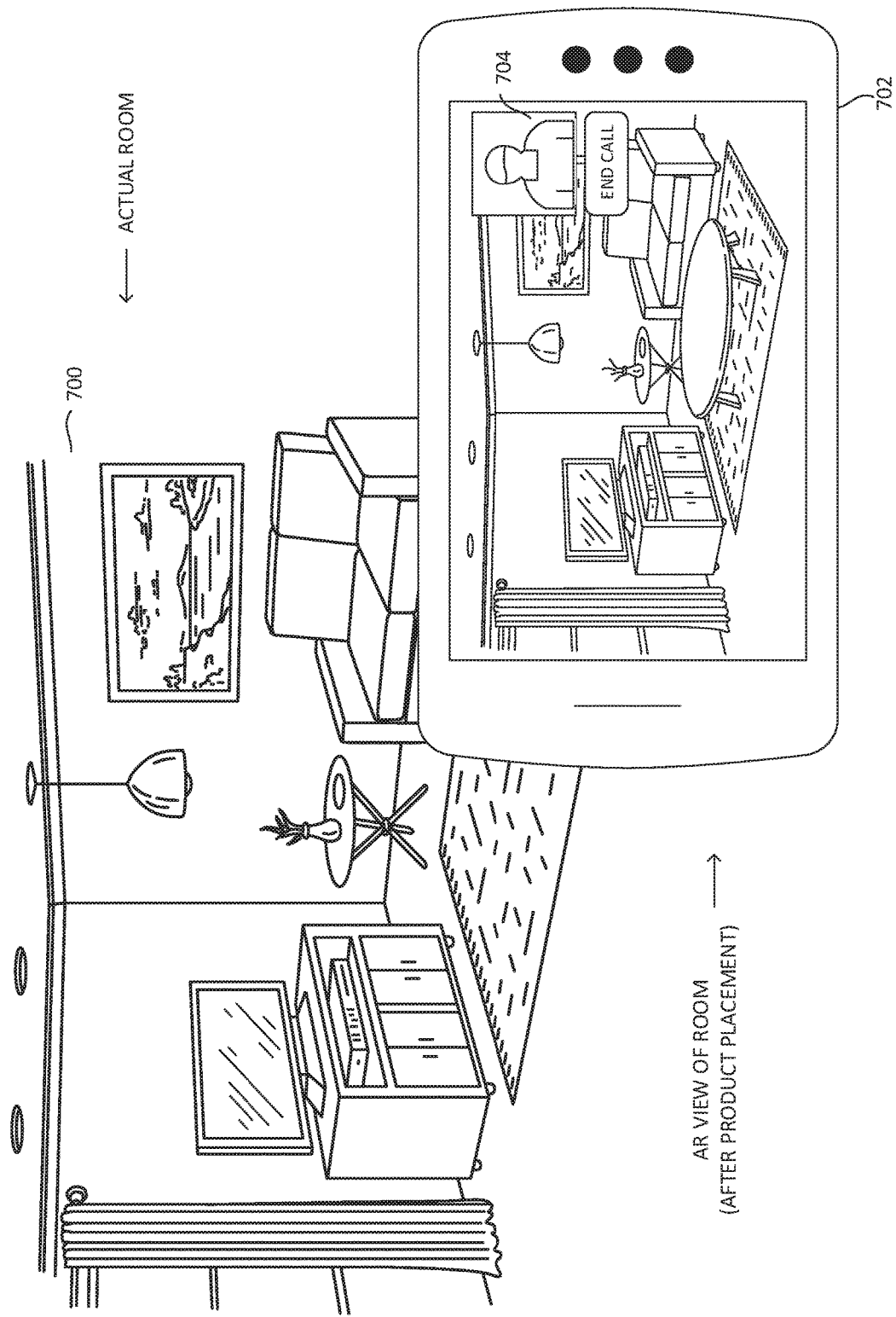
FIG. 7 is a user interface diagram illustrating an example of a user interface for an AR-capable mobile application that provides for a live AR view of a scene, for which visual content, representing one or more objects, has been selected and positioned by one or more remote room designers, consistent with embodiments of the present invention.

FIG. 7 is a user interface diagram illustrating an example of a user interface for an AR-capable mobile application that provides for viewing AR scenes, for which a coffee table has been selected and positioned by one or more remote room designers, consistent with embodiments of the present invention. In the example of FIG. 7, the room designer has selected a coffee table, which is appearing in the live AR scene being rendered by the end-user's mobile computing device. In this example, the end-user is collaborating live with the room designer, via a video call. Accordingly, as shown in FIG. 7, a video call panel 704 appears in the upper right corner of the user interface. As such, the end-user can discuss, in real time, his or her preferences with the room designer. If, for example, the room designer positions a coffee table in AR space, and the end-user does not like it, the end-user can simply indicate this preference to the room designer (e.g., via the live video call session) who can immediately replace the AR object with another. In this manner, the end-user and room designer can quickly and efficiently collaborate to identify one or more products of interest to the end-user.

With some embodiments, the room designer can save different room designs, with different selections of products and/or different placements of those products in AR space, for a given end-user's design consultation request. Accordingly, the end-user can simply select from a list of previously saved room designs to recall any one of the previously saved room designs and thereby obtain a real-world AR view of the room design, with the selected products and specific product placements. This feature depends upon the AR mobile application being able to realign a scene from one AR session to another. With some embodiments, each product that is placed in AR space by a room designer, is saved and accessible to the end-user in a list. At any time, the end-user can simply recall this list to view information about the product and/or conclude a purchase transaction to purchase the product. With some embodiments, an end-user can select to purchase all the products that are presented in a particular room design. This will quickly facilitate the online checkout process, by generating a purchase list of the selected products for concluding the purchase transaction.

Figure 8:
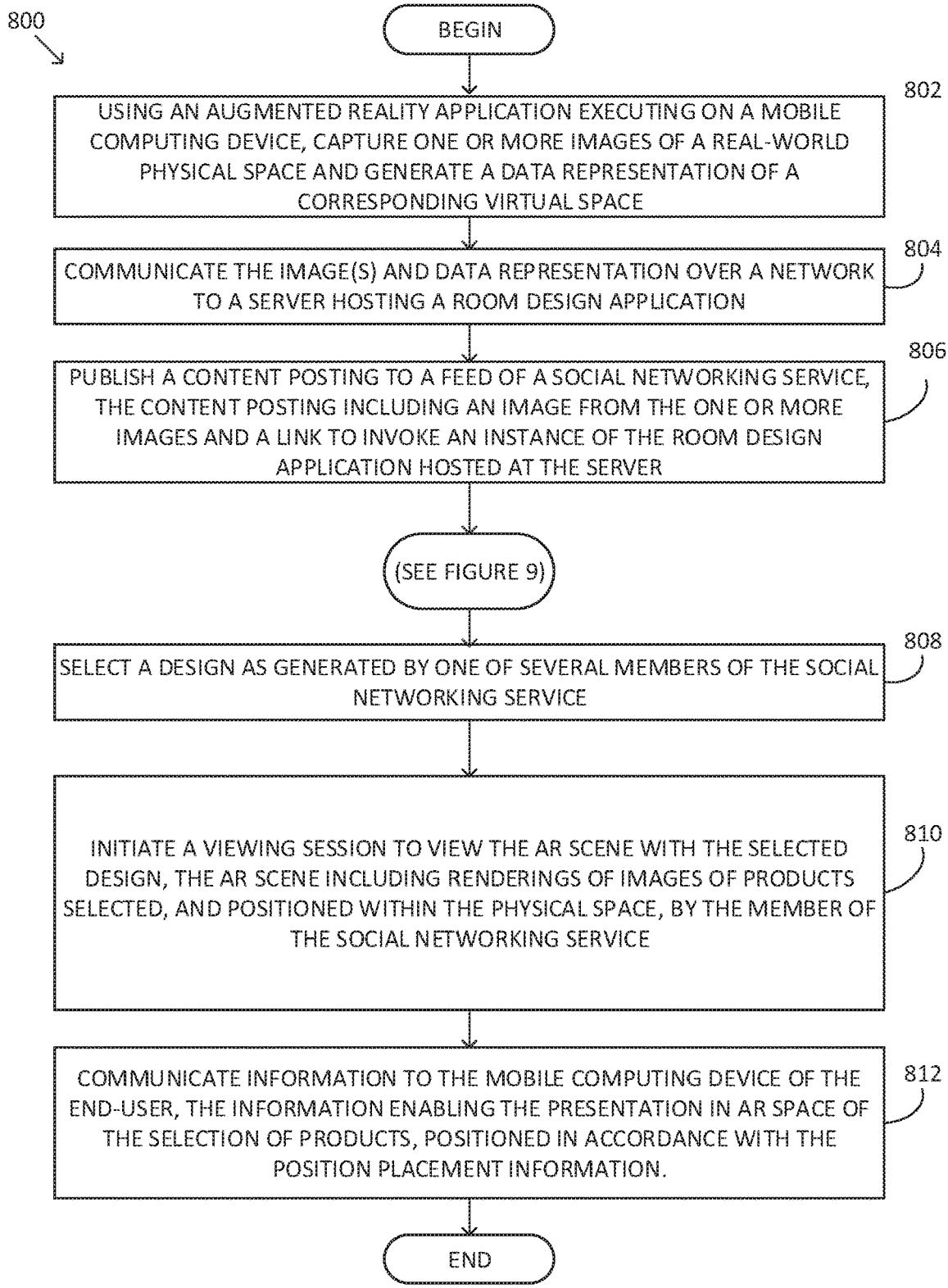
FIG. 8 is a flow diagram illustrating the various method operations that occur when requesting help for a room design from members of a social networking service, according to some embodiments of the present invention.

FIG. 8 is a flow diagram illustrating the various method operations that occur when requesting help for a room design from members of a social networking service, according to some embodiments of the present invention. At method operation 802, an end-user, using an AR-capable application executing on a mobile computing device, captures one or more images of a real-world physical space. For example, the end-user may simply hold the mobile computing device in a manner to point the image sensor (e.g., camera) of the mobile computing device in the direction of the real-world scene of interest to the end-user. Then, the end-user may simply push or select a button to initiate a capture of an image or video and invoke a user interface flow for publishing a content posting to a social networking service. Accordingly, when the end-user invokes the content sharing flow, the mobile computing device will not only capture one or more images, but also analyze the image(s) to create a data representation of a virtual space that corresponds with the image(s) of the real-world physical space that has been captured.

Next, at operation 804, the captured image or images, along with the data representation of the virtual space, are communicated over a wireless network to a server computer that is hosting, or otherwise associated, with a room design application. The images and associated meta-data for the virtual space are processed and stored at the remote server computer, so as to be accessible by client computing devices of others who have been invited to access the stored information.

At operation 806, as part of the content sharing flow, the AR-capable application presents to the end-user a content sharing interface. By interacting with the content sharing interface, the end-user can select which of several images is to be included with the content posting when published to the feed of the social networking service. Similarly, the end-user can specify a target audience for the content posting. The target audience may be some specified group (e.g., the public, friends, some pre-defined interest group, etc.) or some subset of specific members of the social networking service. The end-user may also provide commentary (e.g., text) to indicate various parameters or requirements in connection with his or her design request. For instance, the end-user may indicate that he or she is looking for a specific piece of furniture, or, a specific color, or texture, or, certain styles, and so forth. This will provide recipients of the content posting and design request with some context for selecting items to be added to the end-user's room design. The content posting will also include, by default, a link to the room design application hosted by the remote server computer. Accordingly, by selecting the link, a recipient of the content posting will be directed to the room design application via which the end-user's room (e.g., images and corresponding virtual space) can be accessed. With some embodiments, the link is generated by the mobile application to invoke the room design application and automatically initiate a design session using the image or images and corresponding data representation of the virtual space, as communicated to the remote server computer from the end-user's mobile computing device. Finally, the end-user will publish the content posting to a feed of a social networking service, where other members who are in the target audience will be able to view the content posting in their respective, personalized feeds. Of course, in other embodiments, the content posting may be communicated via any number of other communication channels to recipients who may, or may not, be members of a social networking service.

With some embodiments, the room design application and service may be operable with more than one social networking service. Furthermore, the social networking service may be an external service, or social networking functionality may be built-in to the room design application, such that the social networking service is integrated with the room design application and service. Furthermore, while this example describes the use of a feed (e.g., a content feed or news feed) to share an end-user's content posting and design request, in other embodiments, other sharing mechanisms may be implemented and deployed. For instance, consistent with some embodiments, the content sharing flow may provide a user interface that allows the end-user to not only select a particular social network, but also a sharing mechanism, such as a feed, direct message, email, and so forth.

Figure 9:
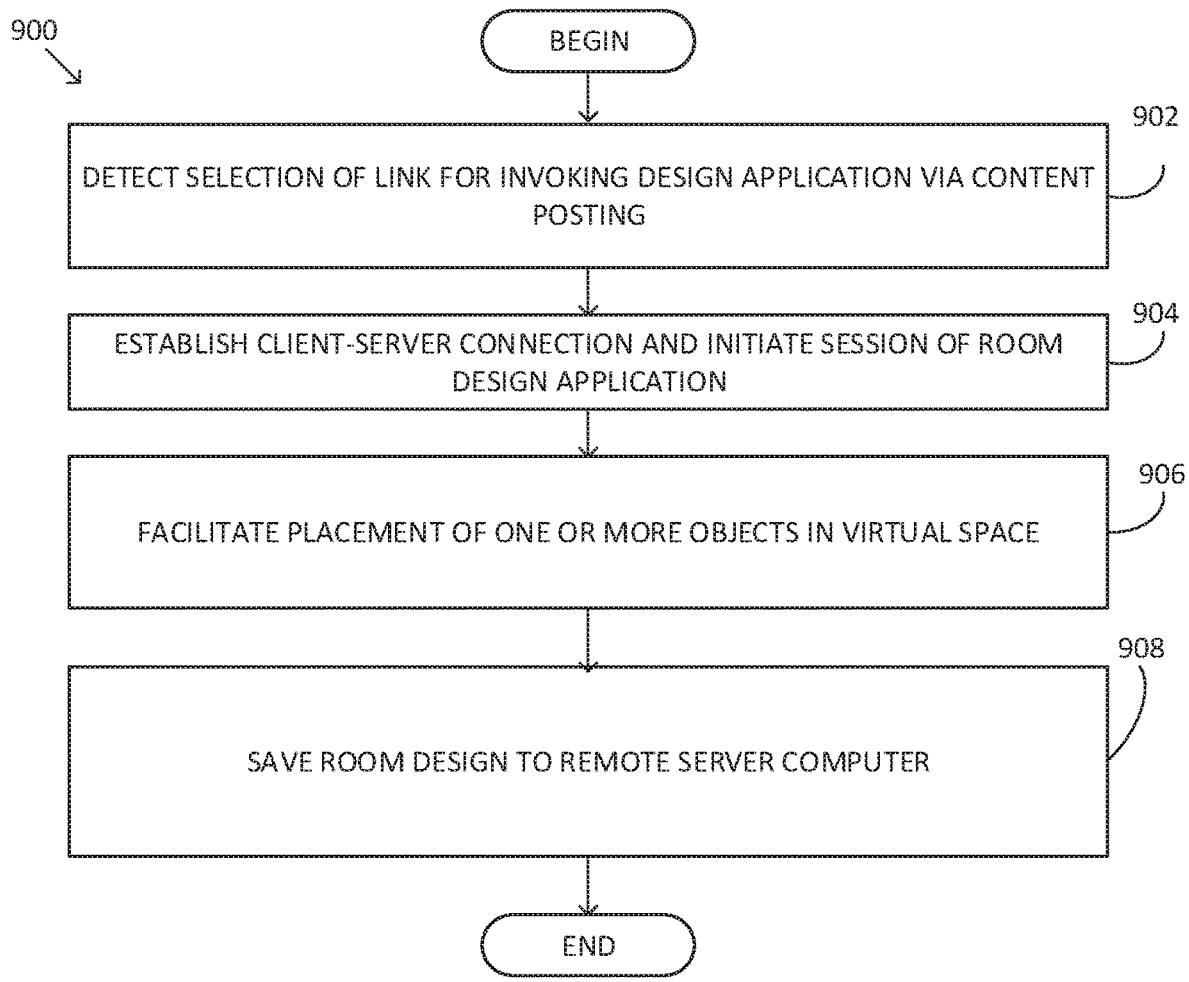
FIG. 9 is flow diagram illustrating the various method operations that occur when a member targeted to receive a content posting and design request receives and processes such a design request, consistent with some embodiments.

Subsequent to the end-user publishing the content posting to a feed of a social networking service, members of the target audience who view the content posting are able to invoke the room design application, for example, by selecting the link that is published with the content posting and design request. Accordingly, FIG. 9 illustrates the method operations that occur at a client device of a member who has received an end-user's content posting. At method operation 902, when the recipient views the content posting in the feed of a social networking service, and then selects the link to invoke the room design application, the recipient's client device detects the link selection and processes a request to invoke the room design service based on the address of the service specified in the selected link. At method operation 904, the client device, upon detecting selection of the link to invoke the room design service, establishes a client-server session with the remote server computer hosting the room design service. Next, at operation 906, the recipient of the content posting is able to interact with the various user interfaces of the room design service to view images of the end-user's room (or other real-world physical space) and to facilitate the selection and positioning of objects (images of products or household items, etc.) relative to the virtual space represented by the data representation associated with the images captured by the end-user's mobile computing device. When the recipient has completed a design—that is, selected and positioned some set of products—the resulting selection and placement information is saved as a room design, associated with the particular end-user's original images and virtual space meta-data. Accordingly, the information generated by the room design application, when communicated to and processed by the AR-capable application executing at the end-user's mobile computing device will allow the application to render a live, AR view of the end-user's space with virtual items, providing the end-user with a realistic visual presentation of the products, during the live, AR viewing session.

Referring again to FIG. 8, after a number of members of the target audience have generated and saved room designs for the end-user's design request, the end-user can view a list of members of the social networking service who have created and saved room designs for the particular design request. Accordingly, at method operation 808, the end-user can select one design from those that have been generated and saved by members of the target audience and social networking service. At method operation 810, a live AR viewing session is initiated to include the particular objects or items as selected and positioned by the particular member whose room design has been selected by the end-user for viewing. At method operation 810, when the end-user select a particular room design to view, the AR-capable application may request the information associated with the saved room design from the room design service hosted at the remote server computer. Alternatively, this information may be periodically "pushed" to the end-user's mobile computing device. In any case, once the end-user selects a particular room design to view, the AR-capable application executing on the end-user's mobile computing device will initiate the image sensor, attempt to realign the scene, and render the images associated with the selected and positioned products that make up the saved room design.

Consistent with some embodiments, multiple room designers may collaborate to establish a single room design. In such an instance, the end-user may be presented with an option to select a particular room design, where the room design is designated with information identifying the particular room designers who have collaborated to contribute various aspects of the room design.

Figure 10:
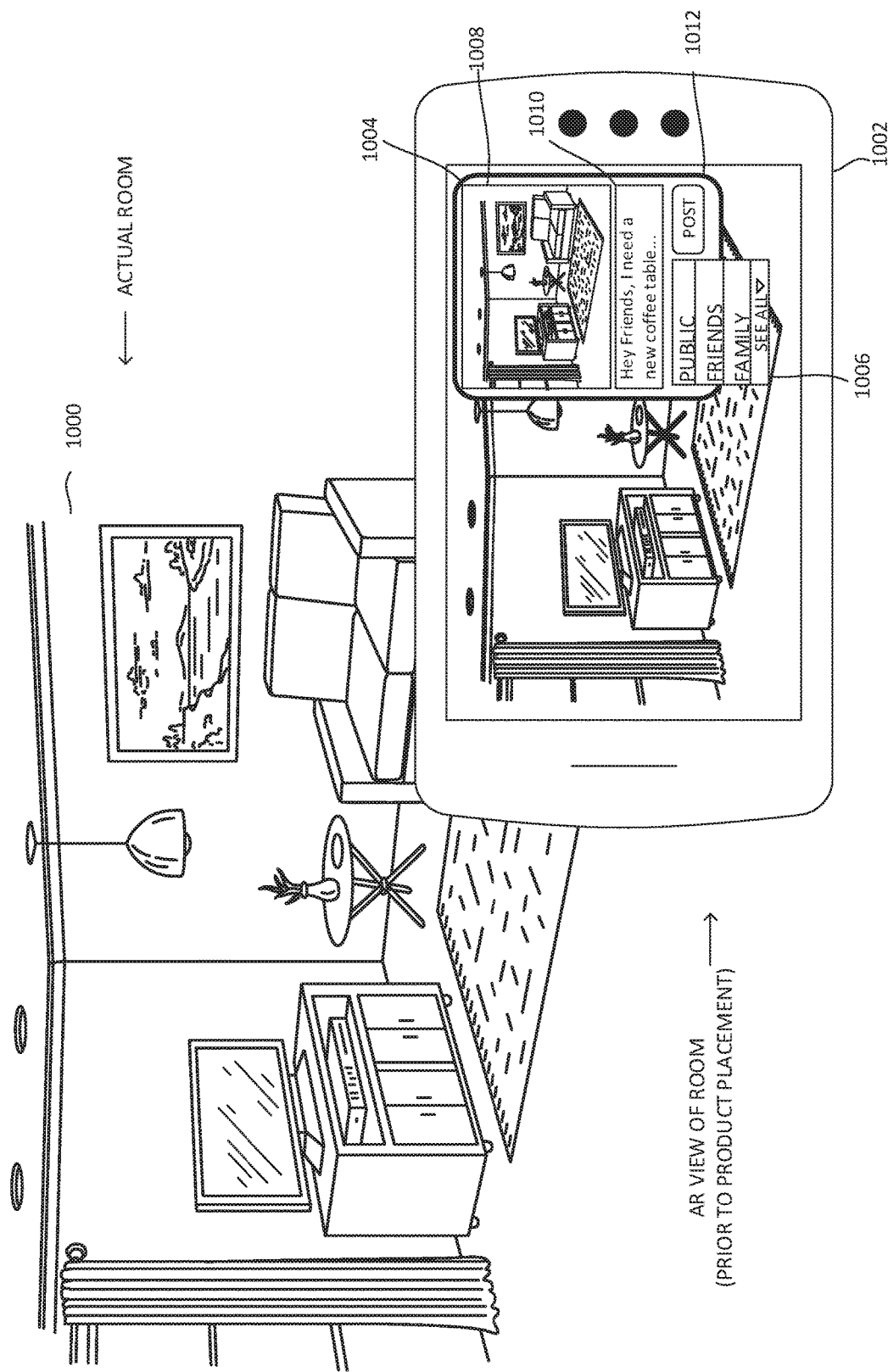
FIG. 10 is a user interface diagram illustrating an example of a user interface for an AR-capable mobile application that includes a content posting interface, for publishing a design request to a feed of a social networking service, according to some embodiments of the invention.

FIG. 10 is a user interface diagram illustrating an example of a user interface for an AR-capable mobile application that includes a content posting interface, for publishing a design request to a feed of a social networking service, according to some embodiments of the invention. In this example, the end-user's mobile computing device 1002 is executing an AR-capable application. The AR-capable application is rendering a live view of the end-user's room 1000. If, for example, the end-user would like the help of others in designing the room—selecting and virtually positioning various household products in the room—the end-user can simply interact with the AR-capable application to generate a content posting for publishing to a target audience of a social networking service.

As illustrated in FIG. 10, the mobile computing device 1002 is presenting a content sharing interface 1004, that provides a mechanism by which the end-user can publish a content posting to a feed of a social networking application or service. In this example, the content posting includes an image 1008 of the room 1000, as captured with an image sensor of the mobile computing device 1002. With some embodiments, this image is captured when the end-user selects a button or otherwise interacts with the AR-enabled application to invoke the content sharing flow. The content sharing interface also includes a text box 1010 where the end-user can provide commentary relating to his or her design request. For instance, the end-user may specify what it is specifically, that he or she is looking for in a design. As illustrated in the content sharing interface 1004, a drop-down list 1006 is presented with several suggested target audiences. For instance, the end-user may select to publish the content posting to the public, his or her friends or connections as memorialized by the social networking service, or his or her family. Of course, other options are possible. Finally, while not explicitly shown in FIG. 10, the content posting will automatically include a link that is generated to allow the recipient of the content posting to invoke a design session with the room design service, to generate a particular design in response to the end-user's design request.

Figure 11:
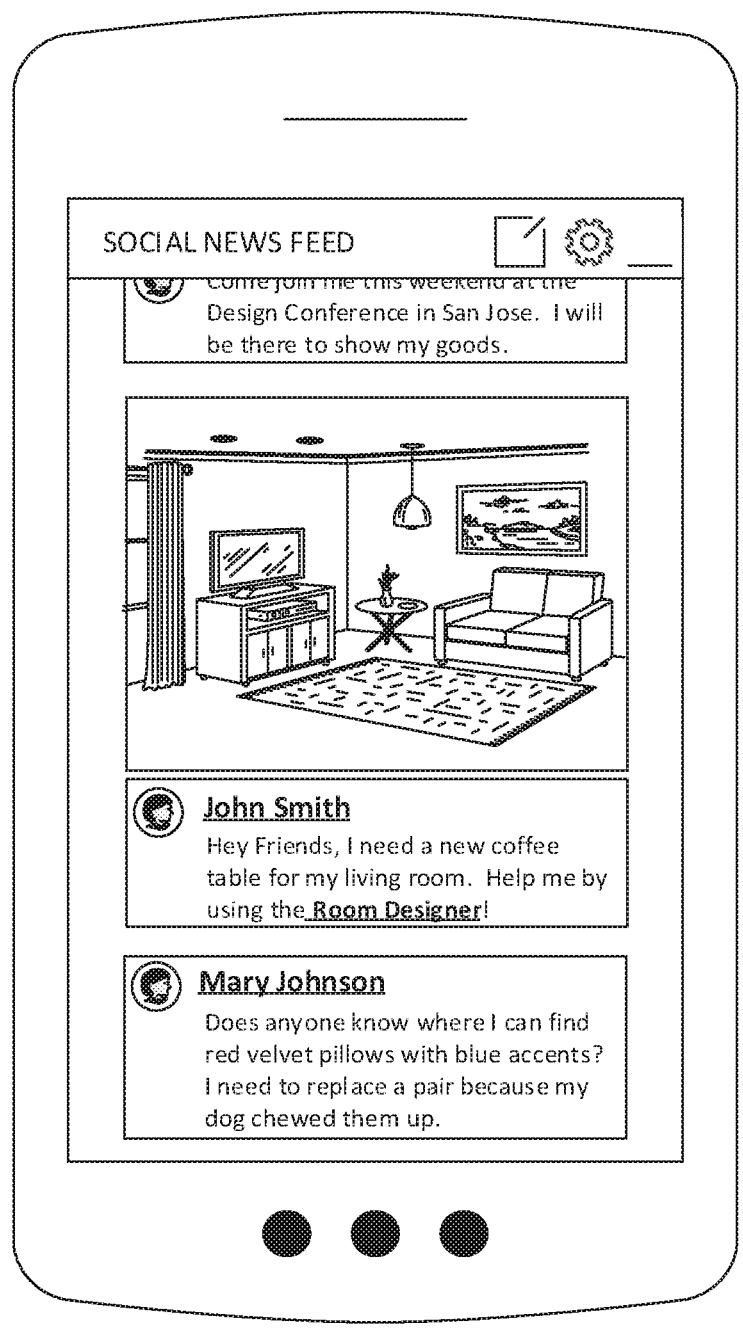
FIG. 11 is a user interface diagram illustrating an example of a user interface for a feed of a social networking service, including a content posting with a design request, consistent with some embodiments of the invention.

FIG. 11 is a user interface diagram illustrating an example of a user interface for a feed of a social networking service, including a content posting with a design request, consistent with some embodiments of the invention. By way of example, after the end-user generates the content posting and publishes the content posting to the feed of a social networking service, members of the target audience will be able to view the content posting in their respective, personalized content feeds. As illustrated in FIG. 11, the mobile device 1102 is presenting a user interface for a feed of a social networking service, and the feed includes a content posting 1104 that was generated by an end-user's AR-capable application. The content posting includes an image of the end-user's room, for which a design is being requested. Additionally, the content posting includes a comment provided by the end-user, and a link to invoke the room design service.

Figure 12:
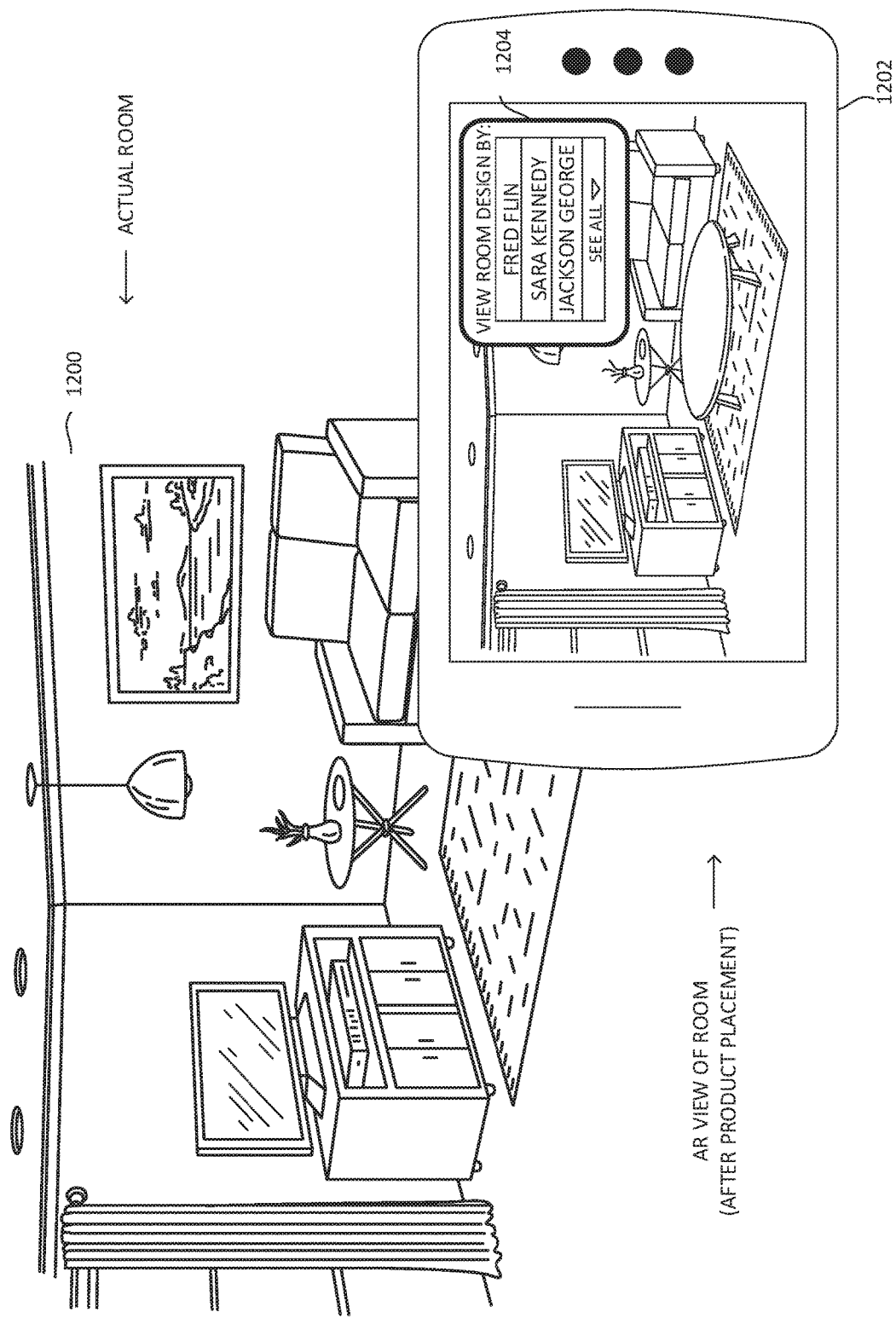
FIG. 12 is a user interface diagram illustrating an example of a user interface that provides an end-user with an option to select from several room designs, as generated and saved by members of a social networking service who received a design request, consistent with embodiments of the invention.

FIG. 12 is a user interface diagram illustrating an example of a user interface that provides an end-user with an option to select from several room designs, as generated by members of a social networking service who received a design request, consistent with embodiments of the invention. After a content posting has been published, and after several members of the target audience have interacted with the room design service to generate and save designs in response to the end-user's design request, the end-user may be presented with a list 1204 of available designs from which to choose. Accordingly, by selecting a particular saved design, the end-user can initiate a live AR viewing session to view an AR scene that is rendered to include images associated with the product selections and positions of the particular saved design. In this way, the end-user can very quickly cycle through and view different designs, as created by different members of the target audience to which the end-user published or posted his or her content posting and design request.

With some embodiments, the overlaid images, representing the products that have been selected and positioned by others, are interactive, such that, selecting an image will present additional information about the image, such as information about the price of the associated product, and so forth. The end-user may be able to save items to a favorites list, for subsequent browsing and/or purchase. Furthermore, the AR-capable application may provide a wide variety of other social features, such as the ability to like, and comment on individual product placements and/or Whole room designs.

Figure 13:
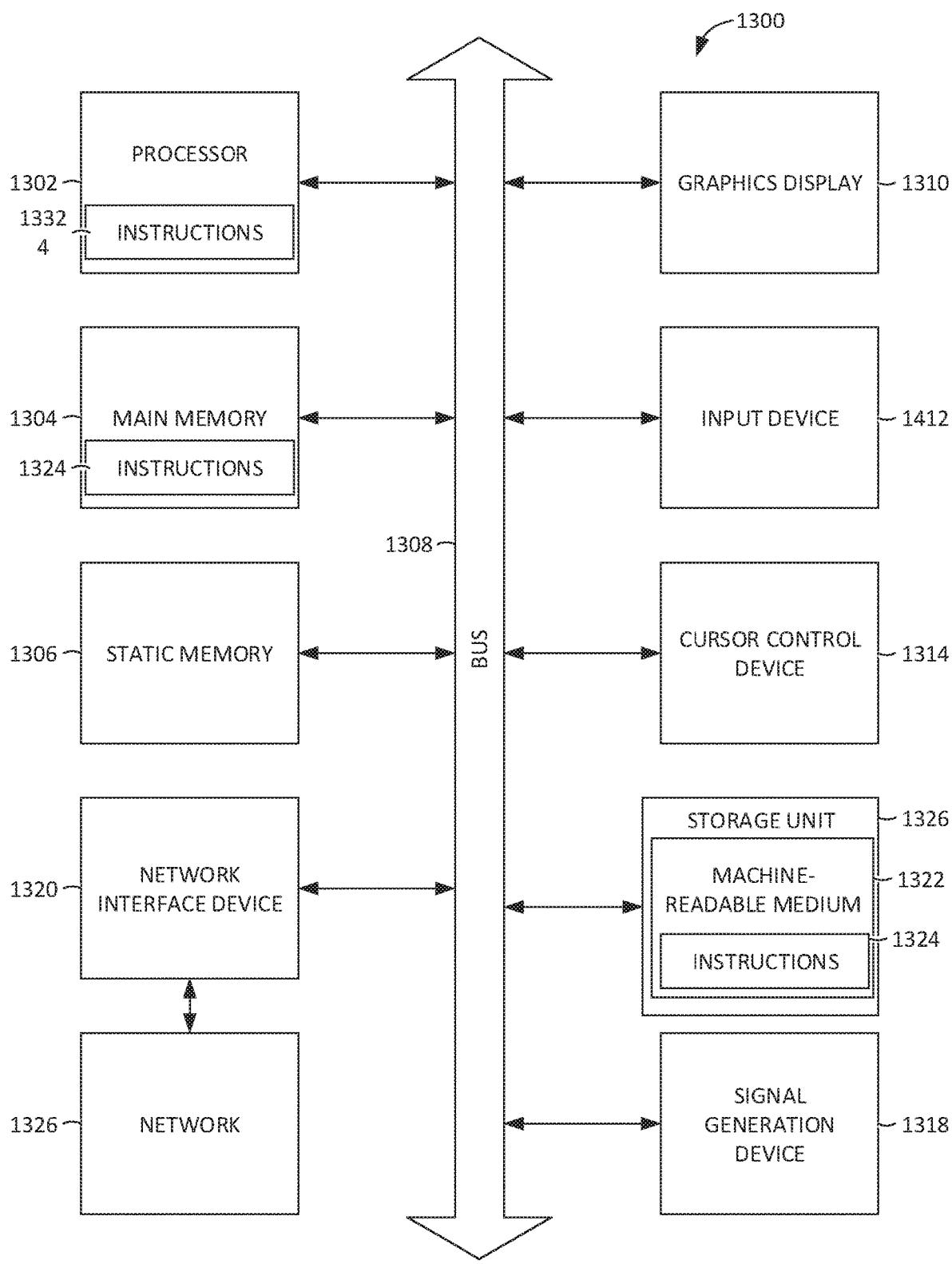
FIG. 13 is a system diagram illustrating an example of a computing device with which, embodiments of the present invention might be implemented.

FIG. 13 is a block diagram illustrating an example of a machine upon which one or more example embodiments may be implemented. In alternative embodiments, the machine (1300) may operate as a standalone device or may be connected (e.g., networked) to other machines. In a networked deployment, the machine (1300) may operate in the capacity of a server machine, a client machine, or both in server-client network environments. In an example, the machine (1300) may act as a peer machine in peer-to-peer (P2P) (or other distributed) network environment. The machine (1300) may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine (800) is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating in an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) (1300) may include a hardware processor (1302) (e.g., a central processing unit (CPU), a graphics processing unit (GPU), a hardware processor core, or any combination thereof), a main memory (1304) and a static memory (1306), some or all of which may communicate with each other via an interlink (e.g., bus) (1308). The machine (1300) may further include a display device (1310), an alphanumeric input device (1312) (e.g., a keyboard), and a user interface (UI) navigation device (1314) (e.g., a mouse). In an example, the display device (1310), input device (1312) and UI navigation device (1314) may be a touch screen display. The machine (1300) may additionally include a mass storage device (e.g., drive unit) (1316), a signal generation device (1318) (e.g., a speaker), a network interface device (1320), and one or more sensors (1321), such as a global positioning system (GPS) sensor, compass, accelerometer, or another sensor. The machine (1300) may include an output controller (1328), such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device (1316) may include a machine-readable medium (1322) on which is stored one or more sets of data structures or instructions (1324) (e.g., software) embodying or utilized by any one or more of the techniques or functions described herein. The instructions (1324) may also reside, completely or at least partially, within the main memory (1304), within static memory (1306), or within the hardware processor (1302) during execution thereof by the machine (1300). In an example, one or any combination of the hardware processor (1302), the main memory (1304), the static memory (1306), or the storage device (1316) may constitute machine-readable media.

While the machine-readable medium (1322) is illustrated as a single medium, the term "machine-readable medium" may include a single medium or multiple media (e.g., a centralized or distributed database, and/or associated caches and servers) configured to store the one or more instructions (1324).

The term "machine-readable medium" may include any medium that is capable of storing, encoding, or carrying instructions (1324) for execution by the machine (1300) and that cause the machine (1300) to perform any one or more of the techniques of the present disclosure, or that is capable of storing, encoding or carrying data structures used by or associated with such instructions (1324). Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions (1324) may further be transmitted or received over a communications network (1326) using a transmission medium via the network interface device (1320) utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device (1320) may include one or more physical jacks (e.g., Ethernet, coaxial, or phone jacks) or one or more antennas to connect to the communications network (1326). In an example, the network interface device (1320) may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions (1324) for execution by the machine (1300), and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and unless otherwise stated, nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for generating a computer user interface with an augmented presentation of a real-world physical space, the method comprising:
    during a first augmented reality viewing session, executing, by a mobile computing device, a first set of instructions associated with an augmented reality application to i) capture one or more images of the real-world physical space ii) generate a first data representation of a virtual space corresponding to the real-world physical space, and iii) communicate the one or more images of the real-world physical space and the first data representation of the virtual space to a server computer;
    executing, by the mobile computing device, a second set of instructions associated with the augmented reality application that cause a content posting to be published to a feed of a social networking service, the content posting including a link to a design application hosted at the server computer and having access to the one or more images of the real-world physical space and the data representation of the virtual space, the design application, when invoked by selection of the link, enabling a recipient of the content posting to generate and save a design for rendering by the augmented reality application, the design including information for rendering one or more images of one or more 3D models of products on top of an image of the real-world physical space;
    during a second augmented reality viewing session, at the mobile computing device, receiving, from the server computer, the information for rendering the one or more images of the one or more 3D models of products on top of an image of the real-world physical space, the information including the first data representation of the virtual space;
    performing, by the mobile computing device, a realignment procedure by:
        generating a second data representation of a virtual space corresponding to the real-world physical space; and
        ensuring that the second data representation of the virtual space is consistent with the first data representation of the virtual space; and
    generating the computer user interface with an augmented presentation of the real-world physical space by rendering the images of the 3D model superimposed over an image of the real-world physical space, using the first data representation of the virtual space to determine a position and orientation of the images of the 3D model.

2. The method of claim 1, wherein the content posting includes designation of one or more members of the social networking service as a target audience for the content posting, the one or more members, by virtue of being designated as the target audience, having authorization to generate and save a design for rendering by the augmented reality application.

3. The method of claim 1, wherein the social networking service and the design application are integral with one another.

4. The method of claim 1, wherein the social networking service is external to the design application and the content posting to be published to the feed of the social networking service is communicated to the external social networking service via a call to an application programming interface (API).

5. The method of claim 1, further comprising:
    executing, by the mobile computing device, a third set of instructions associated with the augmented reality application that cause content to be communicated via a messaging application to a designated recipient, the content including a link to a design application hosted at the server computer and having access to the one or more images of the real-world physical space and the data representation of the virtual space, the design application, when invoked by selection of the link, enabling the designated recipient of the content posting to generate and save a design for rendering by the augmented reality application, the design including information for rendering one or more images of one or more 3D models of products on top of an image of the real-world physical space.

6. A mobile computing device for generating a computer user interface with an augmented presentation of a real-world physical space, the mobile computing device comprising:
    an image sensor;
    a memory storage device storing executable instructions
    a processor, which, upon executing the instructions stored on the memory storage device, causes the mobile computing device to:
    during a first augmented reality viewing session, i) capture one or more images of the real-world physical space using the image sensor, generate a first data representation of a virtual space corresponding to the real-world physical space, communicate the one or more images of the real-world physical space and the data representation of the virtual space to a server computer, and communicate to a server a content posting to be published to a feed of a social networking service, the content posting including a link to a design application hosted at the server computer and having access to the one or more images of the real-world physical space and the data representation of the virtual space, the design application, when invoked by selection of the link, enabling a recipient of the content posting to generate and save a design for rendering by the augmented reality application, the design including information for rendering one or more images of one or more 3D models of products on top of an image of the real-world physical space;
    during a second augmented reality viewing session, receive from the server information for rendering the one or more images of the one or more 3D models of products on top of an image of the real-world physical space;

perform a realignment procedure by:
  generating a second data representation of the virtual space corresponding to the real-world physical space; and
  ensuring that the second data representation of the virtual space is consistent with the first data representation of the virtual space; and
generate a user interface with an augmented presentation of the real-world physical space by rendering the images of the 3D model superimposed over an image of the real-world physical space.

7. The mobile computing device of claim 6, wherein the content posting includes designation of one or more members of the social networking service as a target audience for the content posting, the one or more members, by virtue of being designated as the target audience, having authorization to generate and save a design for rendering by the augmented reality application.

8. The mobile computing device of claim 6, wherein the social networking service and the design application are integral with one another.

9. The mobile computing device of claim 6, wherein the social networking service is external to the design application and the content posting to be published to the feed of the social networking service is communicated to the external social networking service via a call to an application programming interface (API).

10. The mobile computing device of claim 6, further comprising:
  additional instructions that, when executed by the processor, cause the mobile computing device to communicate content via a messaging application to a designated recipient, the content including a link to a design application hosted at the server computer and having access to the one or more images of the real-world physical space and the data representation of the virtual space, the design application, when invoked by selection of the link, enabling the designated recipient of the content posting to generate and save a design for rendering by the augmented reality application, the design including information for rendering one or more images of one or more 3D models of products on top of an image of the real-world physical space.

* * * * *